(12) United States Patent
Teraki

(10) Patent No.: US 12,000,628 B2
(45) Date of Patent: Jun. 4, 2024

(54) MAGNETIC REFRIGERATION MODULE

(71) Applicant: DAIKIN INDUSTRIES, LTD., Osaka (JP)

(72) Inventor: Junichi Teraki, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 610 days.

(21) Appl. No.: 17/176,879

(22) Filed: Feb. 16, 2021

(65) Prior Publication Data

US 2021/0164706 A1    Jun. 3, 2021

Related U.S. Application Data

(63) Continuation of application No. PCT/JP2019/034579, filed on Sep. 3, 2019.

(30) Foreign Application Priority Data

Sep. 14, 2018   (JP) ................................ 2018-172019

(51) Int. Cl.
    *F25B 21/00*      (2006.01)

(52) U.S. Cl.
    CPC ...... *F25B 21/00* (2013.01); *F25B 2321/0021* (2013.01)

(58) Field of Classification Search
    CPC .............. F25B 2321/002; F25B 25/005; F25B 2321/0021; F25B 21/00
See application file for complete search history.

(56) References Cited

U.S. PATENT DOCUMENTS

2008/0314049 A1    12/2008   Shin et al.
2009/0308079 A1    12/2009   Lee
(Continued)

FOREIGN PATENT DOCUMENTS

JP    2009-524796 A    7/2009
JP    2009-543022 A    12/2009
(Continued)

OTHER PUBLICATIONS

International Search Report of corresponding PCT Application No. PCT/JP2019/034579 dated Nov. 5, 2019.
(Continued)

*Primary Examiner* — Ana M Vazquez
(74) *Attorney, Agent, or Firm* — Global IP Counselors, LLP

(57) ABSTRACT

A magnetic refrigeration module includes a housing, low and high temperature inflow paths, low and high temperature outflow paths, and first and second intermediate flow paths. The housing houses a magnetic working substance, and forms a flow path. The low and high temperature inflow paths carry heating medium into first and second ends of the flow path. First and second spaces are formed between the first and second ends and the low and high temperature inflow paths. The low and high temperature outflow paths receive the heating medium from the first and second ends of the flow path. The first and second intermediate flow paths communicate with the low and high temperature inflow paths and the first and second spaces. The first and second intermediate flow paths expand heating medium flow from the low and high temperature inflow paths to the first and second spaces.

21 Claims, 13 Drawing Sheets

(56) References Cited

U.S. PATENT DOCUMENTS

| | | | |
|---|---|---|---|
| 2011/0192836 A1 | 8/2011 | Muller et al. | |
| 2011/0239662 A1 | 10/2011 | Bahl et al. | |
| 2012/0291453 A1 | 11/2012 | Watanabe et al. | |
| 2015/0068219 A1 | 3/2015 | Komorowski et al. | |
| 2017/0159979 A1 | 6/2017 | Komorowski et al. | |
| 2017/0241706 A1* | 8/2017 | Holladay | F25B 21/00 |

FOREIGN PATENT DOCUMENTS

| | | |
|---|---|---|
| JP | 2012-505364 A | 3/2012 |
| JP | 2015-78790 A | 4/2015 |
| JP | 2016-530479 A | 9/2016 |
| WO | 2014/117823 A1 | 8/2014 |

OTHER PUBLICATIONS

European Search Report of corresponding EP Application No. 19 86 0029.8 dated Feb. 23, 2022.
International Preliminary Report of corresponding PCT Application No. PCT/JP2019/034579 dated Mar. 25, 2021.

\* cited by examiner

MAGNETIC REFRIGERATION MODULE

CROSS-REFERENCE TO RELATED APPLICATIONS

This is a continuation of International Application No. PCT/JP2019/034579 filed on Sep. 3, 2019, which claims priority to Japanese Patent Application No. 2018-172019, filed on Sep. 14, 2018. The entire disclosures of these applications are incorporated by reference herein.

BACKGROUND

Field of Invention

The present disclosure relates to a magnetic refrigeration module.

Background Information

A magnetic refrigeration module for producing cold thermal energy and warm thermal energy by using a magnetocaloric effect has been known (see, for example, Japanese Unexamined Patent Publication No. 2016-530479). The magnetic refrigeration module of this document is configured to apply and remove a magnetic field to and from a housing that houses a magnetic working substance, and to cause a heating medium to flow into and out of the housing, thereby generating the cold thermal energy and the warm thermal energy.

SUMMARY

A first aspect of the present disclosure is directed to a magnetic refrigeration module including a housing, a low-temperature inflow path, a high-temperature inflow path, a low-temperature outflow path, a low-temperature outflow path, a first intermediate flow path, and a second intermediate flow path. The housing houses a magnetic working substance. The housing forms a flow path configured to carry flow of a heating medium therethrough. The low-temperature inflow path is configured to carry flow of the heating medium therethrough into a first end of the flow path. A first space is formed between the first end of the flow path and the low-temperature inflow path. The high-temperature inflow path is configured to carry flow of the heating medium therethrough into a second end of the flow path. A second space is formed between the second end of the flow path and the high-temperature inflow path. The low-temperature outflow path is configured to receive flow of the heating medium therethrough that is flowing out from the first end of the flow path. The high-temperature outflow path is configured to receive flow of the heating medium therethrough that is flowing out from the second end of the flow path. The first intermediate flow path communicates with the low-temperature inflow path and the first space. The first intermediate flow path is configured to expand a flow of the heating medium heading from the low-temperature inflow path to the first space. The second intermediate flow path communicates with the high-temperature inflow path and the second space. The second intermediate flow path is configured to expand a flow of the heating medium heading from the high-temperature inflow path to the second space.

DETAILED DESCRIPTION OF EMBODIMENT(S)

First Embodiment

A first embodiment will be described below. A magnetic refrigeration module (20) of the present embodiment controls the temperature of a heating medium by means of a magnetocaloric effect, and is provided in an air-conditioning system (10) configured as, for example, a chiller for cooling purpose only. Note that the use of the magnetic refrigeration module (20) is not limited to this. For example, the magnetic refrigeration module (20) may be provided for an air conditioner.

Configuration of Air-Conditioning System

Figure 1:
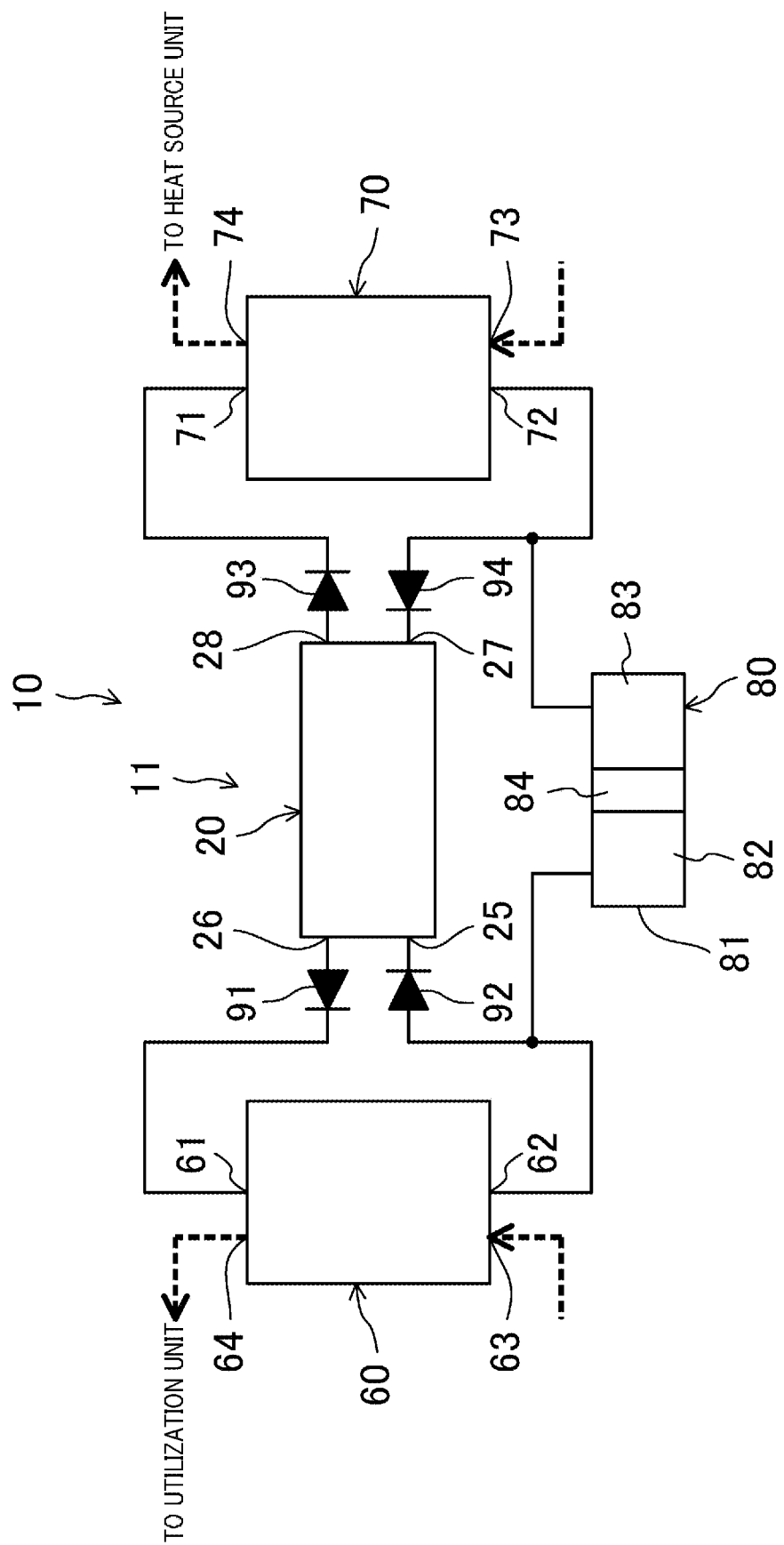
FIG. 1 is a circuit diagram schematically illustrating a configuration of an air-conditioning system according to a first embodiment.

FIG. 1 is a circuit diagram schematically illustrating a configuration of the air-conditioning system (10) according to the first embodiment. As shown in this figure, the air-conditioning system (10) includes a heating medium circuit (11) provided with the magnetic refrigeration module (20), a low-temperature heat exchanger (60), a high-temperature heat exchanger (70), and a heating medium pump (80). The components of the heating medium circuit (11) are connected together through heating medium pipes.

The magnetic refrigeration module (20) includes a magnetic working substance (24), and causes a magnetocaloric effect by applying or removing a magnetic field to or from the magnetic working substance (24), thereby heating or cooling a heating medium flowing therein. The magnetic refrigeration module (20) has a low-temperature inflow path (25), a low-temperature outflow path (26), a high-temperature inflow path (27), and a high-temperature outflow path (28). The inflow paths (25, 27) and the outflow paths (26, 28) are in communication with an internal space of a housing (22) (see FIG. 2) of the magnetic refrigeration module (20). The heating medium coming from the low-temperature inflow path (25) flows through the housing (22), and is discharged from the high-temperature outflow path (28). The heating medium coming from the high-temperature inflow path (27) flows through the housing (22), and is discharged from the low-temperature outflow path (26). The configuration of the magnetic refrigeration module (20) will be described in detail later.

The low-temperature heat exchanger (60) causes heat exchange between the heating medium cooled in the magnetic refrigeration module (20) and a secondary refrigerant flowing through a utilization unit (e.g., an air handling unit), which is not illustrated. The low-temperature heat exchanger (60) has a first inflow port (61) connected to the low-temperature outflow path (26) of the magnetic refrigeration module (20), a first outflow port (62) connected to the low-temperature inflow path (25) of the magnetic refrigeration module (20), and a third inflow port (63) and a third outflow port (64) both connected to the utilization unit.

A heating medium pipe between the low-temperature outflow path (26) and the first inflow port (61) is provided with a first check valve (91) which allows the heating medium to flow from the former to the latter, while preventing the heating medium from flowing in the reverse direction. A heating medium pipe between the low-temperature inflow path (25) and the first outflow port (62) is provided with a second check valve (92) which allows the heating medium to flow from the latter to the former, while preventing the heating medium from flowing in the reverse direction.

The high-temperature heat exchanger (70) causes heat exchange between the heating medium heated in the magnetic refrigeration module (20) and a secondary refrigerant flowing through a heat source unit (such as a cooling tower), which is not illustrated. The high-temperature heat exchanger (70) has a second inflow port (71) connected to the high-temperature outflow path (28) of the magnetic refrigeration module (20), a second outflow port (72) connected to the high-temperature inflow path (27) of the magnetic refrigeration module (20), and a fourth inflow port (73) and a fourth outflow port (74) both connected to the heat source unit.

A heating medium pipe between the high-temperature outflow path (28) and the second inflow port (71) is provided with a third check valve (93) which allows the heating medium to flow from the former to the latter, while preventing the heating medium from flowing in the reverse direction. A heating medium pipe between the high-temperature inflow path (27) and the second outflow port (72) is provided with a fourth check valve (94) which allows the heating medium to flow from the latter to the former, while preventing the heating medium from flowing in the reverse direction.

The heating medium pump (80) allows the heating medium to flow between the magnetic refrigeration module (20) and the heat exchangers (60, 70). The heating medium pump (80) is configured as a piston pump in this example, and includes a cylinder (81) and a piston (84) disposed therein. The piston (84) partitions the interior of the cylinder (81) into a first chamber (82) and a second chamber (83). The first chamber (82) communicates with a portion of the heating medium pipe between the low-temperature heat exchanger (60) and the second check valve (92), and the second chamber (83) communicates with a portion of the heating medium pipe between the high-temperature heat exchanger (70) and the fourth check valve (94).

The heating medium pump (80) is configured to have its piston (84) reciprocated in the cylinder (81) to perform a first operation for discharging the heating medium from the first chamber (82) and sucking the heating medium into the second chamber (83), and a second operation for discharging the heating medium from the second chamber (83) and sucking the heating medium into the first chamber (82).

Configuration of Magnetic Refrigeration Module

Figure 2:
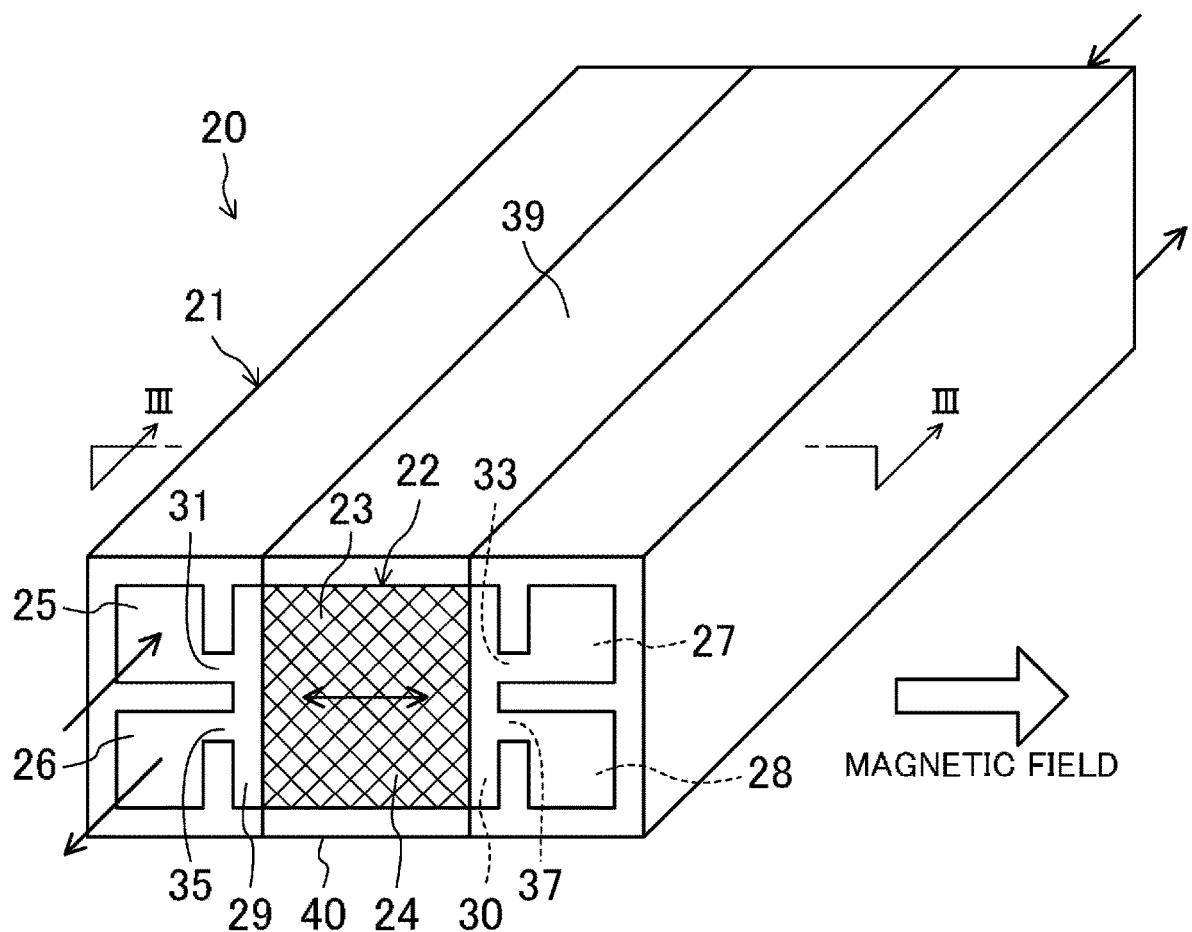
FIG. 2 is a perspective view schematically illustrating a configuration of a magnetic refrigeration module of the first embodiment.
Figure 3:
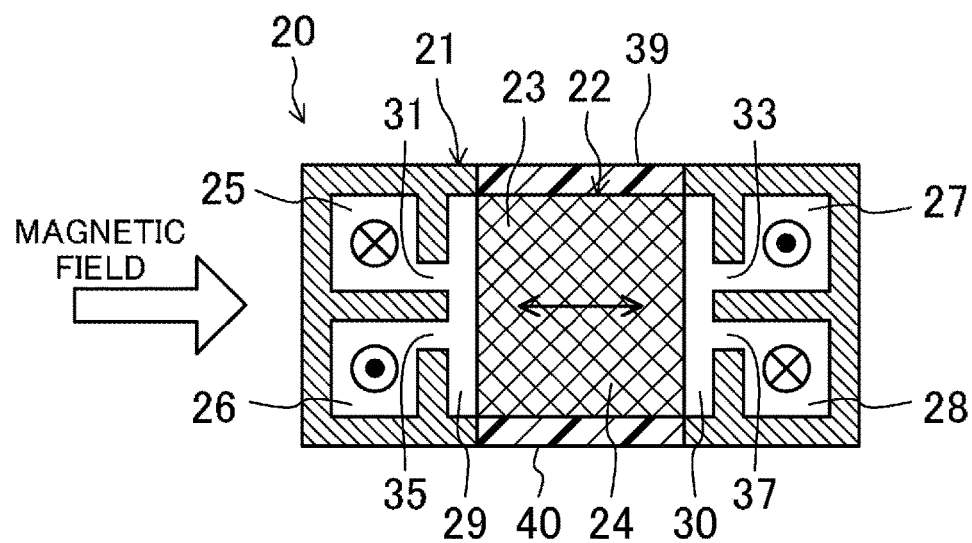
FIG. 3 is a cross-sectional view taken along line III-III of FIG. 2.

FIG. 2 is a perspective view schematically illustrating the configuration of the magnetic refrigeration module (20). FIG. 3 is a cross-sectional view taken along line III-III of FIG. 2. As shown in the figure, the magnetic refrigeration module (20) includes a housing (22), a low-temperature inflow path (25), a high-temperature inflow path (27), a low-temperature outflow path (26), a high-temperature outflow path (28), and a case (21) housing these components.

The housing (22) is formed in a rectangular parallelepiped shape extending in a longitudinal direction of the magnetic refrigeration module (20) (i.e., a direction perpendicular to the plane of FIG. 3). The housing (22) houses a magnetic working substance (24). The housing (22) forms a flow path (23) through which the heating medium flows. One end of the flow path (23) corresponds to the left end of the housing (22) in FIGS. 2 and 3, and the other end corresponds to the right end of the housing (22) in FIGS. 2 and 3. Therefore, the heating medium flows in the flow path (23) generally in the left-right direction in FIGS. 2 and 3 (see the two-way arrow in FIG. 3). This direction substantially coincides with the direction of a magnetic field applied to the housing (22) as shown in FIGS. 2 and 3.

The low-temperature inflow path (25) is a rectangular tube-shaped flow path extending in the longitudinal direction of the magnetic refrigeration module (20). The low-temperature inflow path (25) has a sealed end on the rear side in FIGS. 2 and 3, and an open end on the front side in the same figures. The front end of the low-temperature inflow path (25) is connected to the first outflow port (62) of the low-temperature heat exchanger (60) via a heating medium pipe. The low-temperature inflow path (25) allows the heating medium coming from the low-temperature heat exchanger (60) to flow into one end of the flow path (23) in the housing (22). The heating medium flows through the low-temperature inflow path (25) from the front side to the rear side in FIGS. 2 and 3 (see an arrows in FIG. 2 and a symbol in FIG. 3).

The high-temperature inflow path (27) is a rectangular tube-shaped flow path extending in the longitudinal direction of the magnetic refrigeration module (20). The high-temperature inflow path (27) has a sealed end on the front side in FIGS. 2 and 3, and an open end on the rear side in the same figures. The rear end of the high-temperature inflow path (27) is connected to the second outflow port (72) of the high-temperature heat exchanger (70) via a heating medium pipe. The high-temperature inflow path (27) allows the heating medium coming from the high-temperature heat exchanger (70) to flow into the other end of the flow path (23) in the housing (22). The heating medium flows through the high-temperature inflow path (27) from the rear side to the front side in FIGS. 2 and 3 (see an arrow in FIG. 2 and a symbol in FIG. 3).

The low-temperature outflow path (26) is a rectangular tube-shaped flow path extending in the longitudinal direction of the magnetic refrigeration module (20). The low-temperature outflow path (26) has a sealed end on the rear side in FIGS. 2 and 3, and an open end on the front side in the same figures. The front end of the low-temperature outflow path (26) is connected to the first inflow port (61) of the low-temperature heat exchanger (60) via a heating medium pipe. The heating medium that has come out of the one end of the flow path (23) of the housing (22) flows through the low-temperature outflow path (26). The heating medium flows through the low-temperature outflow path (26) from the rear side to the front side in FIGS. 2 and 3 (see an arrow in FIG. 2 and a symbol in FIG. 3).

The high-temperature outflow path (28) is a rectangular tube-shaped flow path extending in the longitudinal direction of the magnetic refrigeration module (20). The high-temperature outflow path (28) has a sealed end on the front side in FIGS. 2 and 3, and an open end on the rear side in the same figures. The rear end of the high-temperature outflow path (28) is connected to the second inflow port (71) of the high-temperature heat exchanger (70) via a heating medium pipe. The heating medium that has come out of the other end of the flow path (23) of the housing (22) flows through the high-temperature outflow path (28). The heating medium flows through the high-temperature outflow path (28) from the front side to the rear side in FIGS. 2 and 3 (see an arrow in FIG. 2 and a symbol in FIG. 3).

A first space (29) is formed between the one end of the flow path (23) of the housing (22) and the low-temperature inflow and outflow paths (25, 26). The first space (29) is a flat rectangular tube-shaped space extending in the longitudinal direction of the magnetic refrigeration module (20). The first space (29) communicates with the entirety of the one end of the flow path (23) of the housing (22).

A first slit (31) is formed between the low-temperature inflow path (25) and the first space (29) to communicate with both of them. The first slit (31) is an elongated gap extending in the longitudinal direction of the magnetic refrigeration module (20). The first slit (31) expands the flow of the heating medium heading from the low-temperature inflow path (25) to the first space (29). Specifically, the presence of the first slit (31) allows the heating medium flowing through the low-temperature inflow path (25) to flow into substantially the entire first space (29) in the longitudinal direction of the magnetic refrigeration module (20). The first slit (31) constitutes a first intermediate flow path.

A third slit (35) is formed between the low-temperature outflow path (26) and the first space (29) to communicate with both of them. The third slit (35) is an elongated gap extending in the longitudinal direction of the magnetic refrigeration module (20). The third slit (35) allows the heating medium to smoothly flow from the first space (29) to the low-temperature outflow path (26). The third slit (35) constitutes a third intermediate flow path.

The first slit (31) and the third slit (35) are arranged near the center of the housing (22) in a direction perpendicular to the general flow direction of the heating medium in the flow path (23) of the housing (22) (i.e., the vertical direction in FIG. 3). Specifically, the first slit (31) allows a lower end of the low-temperature inflow path (25) arranged in the upper half of the magnetic refrigeration module (20) to communicate with a center portion of the first space (29). The third slit (35) allows an upper end of the low-temperature outflow path (26) arranged in the lower half of the magnetic refrigeration module (20) to communicate with the center portion of the first space (29).

A second space (30) is formed between the other end of the flow path (23) of the housing (22) and the high-temperature inflow and outflow paths (27, 28). The second space (30) is a flat rectangular tube-shaped space extending in the longitudinal direction of the magnetic refrigeration module (20). The second space (30) communicates with the entirety of the other end of the flow path (23) of the housing (22).

A second slit (33) is formed between the high-temperature inflow path (27) and the second space (30) to communicate with both of them. The second slit (33) is an elongated gap extending in the longitudinal direction of the magnetic refrigeration module (20). The second slit (33) expands the flow of the heating medium heading from the high-temperature inflow path (27) to the second space (30). That is, the presence of the second slit (33) allows the heating medium flowing through the high-temperature inflow path (27) to flow into substantially the entire second space (30) in the longitudinal direction of the magnetic refrigeration module (20). The second slit (33) constitutes a second intermediate flow path.

A fourth slit (37) is formed between the high-temperature outflow path (28) and the second space (30) to communicate with both of them. The fourth slit (37) is an elongated gap extending in the longitudinal direction of the magnetic refrigeration module (20). The fourth slit (37) allows the heating medium to smoothly flow from the second space (30) to the high-temperature outflow path (28). The fourth slit (37) constitutes a fourth intermediate flow path.

The second slit (33) and the fourth slit (37) are arranged near the center of the housing (22) in a direction perpendicular to the general flow direction of the heating medium in the flow path (23) of the housing (22). Specifically, the second slit (33) allows a lower end of the high-temperature inflow path (27) arranged in the upper half of the magnetic refrigeration module (20) to communicate with a center portion of the second space (30). The fourth slit (37) allows an upper end of the high-temperature outflow path (28) arranged in the lower half of the magnetic refrigeration module (20) to communicate with the center portion of the second space (30).

The first space (29) and the second space (30) are arranged to sandwich the housing (22) in the direction of the magnetic field applied to the housing (22) (i.e., the left-right direction in FIGS. 2 and 3). That is, the first space (29) is arranged on the left of the housing (22), and the second space (30) is arranged on the right of the housing (22).

The case (21) is a member constituting an outer portion of the magnetic refrigeration module (20). The case (21) houses the housing (22), the low-temperature and high-temperature inflow paths (25, 27), the low-temperature and high-temperature outflow paths (26, 28), the first and second spaces (29, 30), and the first to fourth slits (31, 33, 35, 37).

The case (21) has a portion surrounding the low-temperature inflow and outflow paths (25, 26) (i.e., a left portion in FIGS. 2 and 3) and a portion surrounding the high-temperature inflow and outflow paths (27, 28) (i.e., a right portion in FIGS. 2 and 3), both of which are made of a magnetic material (e.g., an electromagnetic steel sheet). Between these portions, the case (21) has first and second non-magnetic portions (39, 40) made of a non-magnetic material. Here, the case (21) has a first non-magnetic portion (39) between the low-temperature inflow path (25) and the high-temperature inflow path (27), and a second non-magnetic portion (40) between the low-temperature outflow path (26) and the high-temperature outflow path (28). The non-magnetic material forming the first and second non-magnetic portions (39, 40) has a lower thermal conductivity than the material forming both of the portion surrounding the low-temperature inflow and outflow paths (25, 26) and the portion surrounding the high-temperature inflow and outflow paths (27, 28). Each of the first and second non-magnetic portions (39, 40) constitutes a short-circuit blocking portion.

Operation

Next, the operation of the air-conditioning system (10) and the magnetic refrigeration module (20) will be described below.

The air-conditioning system (10) causes the heating medium pump (80) to alternately perform the first and second operations, and applies or removes a magnetic field to or from the housing (22) of the magnetic refrigeration module (20) in response to these operations. This allows cold thermal energy to be supplied to the utilization unit.

Specifically, first, while the flow of the heating medium is stopped, a magnetic field is applied to the housing (22) of the magnetic refrigeration module (20). This causes the magnetic working substance (24) in the housing (22) to generate heat. When the heating medium pump (80) performs the first operation in this state, the piston (84) moves to the left in FIG. 1, and the heating medium is discharged from the first chamber (82). The heating medium discharged from the first chamber (82) flows into the housing (22) through the second check valve (92), and is heated through heat exchange with the heat-generating magnetic working substance (24). Subsequently, the heated heating medium flows into the high-temperature heat exchanger (70) through the third check valve (93), dissipates heat to the secondary refrigerant in the heat source unit, and flows out of the high-temperature heat exchanger (70). The heating medium that has flowed out of the high-temperature heat exchanger (70) is sucked into the second chamber (83) of the heating medium pump (80).

Then, while the flow of the heating medium is stopped, the magnetic field is removed from the housing (22) of the magnetic refrigeration module (20). This causes the magnetic working substance (24) in the housing (22) to absorb heat. When the heating medium pump (80) performs the second operation in this state, the piston (84) moves to the right in FIG. 1, and the heating medium is discharged from the second chamber (83). The heating medium discharged from the second chamber (83) flows into the housing (22) through the fourth check valve (94), and is cooled through heat exchange with the heat-absorbing magnetic working substance (24). Subsequently, the cooled heating medium flows into the low-temperature heat exchanger (60) through the first check valve (91), cools the secondary refrigerant in the utilization unit, and flows out of the low-temperature heat exchanger (60). The heating medium that has flowed out of the low-temperature heat exchanger (60) is sucked into the first chamber (82) of the heating medium pump (80).

Repeating the foregoing operations allows cold thermal energy to be supplied to the low-temperature heat exchanger (60), and allows warm thermal energy to be supplied to the high-temperature heat exchanger (70). Thus, a target space can be cooled using the utilization unit. In a steady state, the low-temperature heat exchanger (60) and the high-temperature heat exchanger (70) are respectively maintained at substantially fixed temperatures adapted to the magnetic working substance (24) in the housing (22). In this example, the magnetic working substance (24) is selected so that the temperature of the low-temperature heat exchanger (60) is maintained at a temperature lower than the temperature of the target space and the temperature of air around the housing (22).

Flow of Heating Medium in Magnetic Refrigeration Module

In the magnetic refrigeration module (20), when the heating medium pump (80) performs the first operation, the heating medium flows through the low-temperature inflow path (25), the first slit (31), the first space (29), the flow path (23) in the housing (22), the second space (30), the fourth slit (37), and the high-temperature outflow path (28) in this order. At this time, the flow of the heating medium coming out of the low-temperature inflow path (25) is expanded by the first slit (31) in the longitudinal direction of the magnetic refrigeration module (20), and flows into substantially the entire first space (29). Further, in the first space (29), the flow of the heating medium is expanded in the vertical direction in FIGS. 2 and 3, which causes the heating medium to flow into substantially the entire flow path (23) of the housing (22).

On the other hand, when the heating medium pump (80) performs the second operation in the magnetic refrigeration module (20), the heating medium flows through the high-temperature inflow path (27), the second slit (33), the second space (30), the flow path (23) in the housing (22), the first space (29), the third slit (35), and the low-temperature outflow path (26) in this order. At this time, the flow of the heating medium coming out of the high-temperature inflow path (27) is expanded by the second slit (33) in the longitudinal direction of the magnetic refrigeration module (20), and flows into substantially the entire second space (30). Further, in the second space (30), the flow of the heating medium is expanded in the vertical direction in FIGS. 2 and 3, which causes the heating medium to flow into substantially the entire flow path (23) of the housing (22).

Advantages of First Embodiment

The magnetic refrigeration module (20) of the present embodiment includes: the housing (22) that houses the magnetic working substance (24) and forms the flow path (23) through which the heating medium flows; the low-temperature inflow path (25) through which the heating medium flows into one end of the flow path (23); the high-temperature inflow path (27) through which the heating medium flows into the other end of the flow path (23); a low-temperature outflow path (26) through which the heating medium coming out of the one end of the flow path (23) flows; and the high-temperature outflow path (28) through which the heating medium coming out of the other end of the flow path (23) flows. In the magnetic refrigeration module (20), the first space (29) is formed between the one end of the flow path (23) and the low-temperature inflow path (25), and the second space (30) is formed between the other end of the flow path (23) and the high-temperature inflow path (27). The magnetic refrigeration module (20) further includes: the first slit (31) that communicates with the low-temperature inflow path (25) and the first space (29) and expands the flow of the heating medium heading from the low-temperature inflow path (25) to the first space (29); and the second slit (33) that communicates with the high-temperature inflow path (27) and the second space (30) and expands the flow of the heating medium heading from the high-temperature inflow path (27) to the second space (30).

Therefore, the heating medium flows from the low-temperature side to the high-temperature side, or from the high-temperature side to the low-temperature side, in the magnetic refrigeration module (20). Specifically, in the magnetic refrigeration module (20), the heating medium flows through the low-temperature inflow path (25), the first slit (31), the first space (29), the flow path (23) in the housing (22), and the high-temperature outflow path (28) in this order, or through the high-temperature inflow path (27), the second slit (33), the second space (30), the flow path (23) in the housing (22), and the low-temperature outflow path (26) in this order. The flow of the heating medium heading from the low-temperature inflow path (25) to the first space (29) via the first slit (31) is expanded by the first slit (31). This causes the heating medium to flow into a wide range of the first space (29). Thus, even if the first space (29), which can constitute a dead volume, is made relatively small, the heating medium flows widely into the subsequent flow path (23) in the housing (22). The flow of the heating medium heading from the high-temperature inflow path (27) to the second space (30) via the second slit (33) is expanded by the second slit (33). This causes the heating medium to flow into a wide range of the second space (30). Thus, even if the second space (30), which can constitute a dead volume, is made relatively small, the heating medium flows widely into the subsequent flow path (23) in the housing (22).

In the magnetic refrigeration module (20) of the present embodiment, the housing (22) is configured to be applied with a magnetic field, and the first space (29) and the second space (30) are arranged to sandwich the housing (22) in the direction of the magnetic field applied to the housing (22). Therefore, the magnetic working substance (24) generates heat when the magnetic field is applied to the housing (22), and absorbs heat when the magnetic field is removed from the housing (22). In addition, both of the general direction in which the heating medium flows from the first space (29) to the second space (30) via the housing (22) and the general direction in which the heating medium flows in the reverse direction are substantially parallel to the direction of the magnetic field applied to the housing (22).

In the magnetic refrigeration module (20) of the present embodiment, the direction in which the heating medium flows into the low-temperature inflow path (25) and the direction in which the heating medium flows out of the low-temperature outflow path (26) are opposite to each other, and the direction in which the heating medium flows into the high-temperature inflow path (27) and the direction in which the heating medium flows out of the high-temperature outflow path (28) are opposite to each other. Therefore, an inlet of the low-temperature inflow path (25) and an outlet of the low-temperature outflow path (26) can be arranged on the same side of the magnetic refrigeration module (20). Further, an inlet of the high-temperature inflow path (27) and an outlet of the high-temperature outflow path (28) can be arranged on the same side of the magnetic refrigeration module (20).

Moreover, in the magnetic refrigeration module (20) of the present embodiment, the direction in which the heating medium flows into the low-temperature inflow path (25) and the direction in which the heating medium flows out of the high-temperature outflow path (28) are the same, and the direction in which the heating medium flows out of the low-temperature outflow path (26) and the direction in which the heating medium flows into the high-temperature inflow path (27) are the same. Therefore, the inlet of the low-temperature inflow path (25) and the outlet of the low-temperature outflow path (26) can be arranged on the side of the magnetic refrigeration module (20) opposite to the inlet of the high-temperature inflow path (27) and the outlet of the high-temperature outflow path (28).

In addition, the magnetic refrigeration module (20) of the present embodiment includes the third slit (35) communicating with the first space (29) and the low-temperature outflow path (26), and the fourth slit (37) communicating with the second space (30) and the high-temperature outflow path (28). The first to fourth slits (31, 33, 35, 37) are arranged near the center of the housing (22) in the direction perpendicular to the flow direction of the heating medium in the flow path (23). Therefore, in the magnetic refrigeration module (20), the heating medium flows through the low-temperature inflow path (25), the first slit (31), the first space (29), the flow path (23) in the housing (22), the second space (30), the fourth slit (37), and the high-temperature outflow path (28) in this order, or through the high-temperature inflow path (27), the second slit (33), the second space (30), the flow path (23) in the housing (22), the first space (29), the third slit (35), and the low-temperature outflow path (26) in this order. Since the first to fourth slits (31, 33, 35, 37) are arranged near the center of the housing (22), the flow of the heating medium coming into the first space (29) or the second space (30) is easily expanded, and the heating medium can flow into the entire housing (22) even when the first space (29) and the second space (30) are reduced in size.

The magnetic refrigeration module (20) of the present embodiment further includes the case (21) that houses the housing (22), the low-temperature and high-temperature inflow paths (25, 27), the low-temperature and high-temperature outflow paths (26, 28), and the first and second slits (31, 33). Thus, the components of the magnetic refrigeration module (20) can be unitized using the case (21).

In the magnetic refrigeration module (20) of the present embodiment, at least a portion of the case (21) is made of a magnetic material. Therefore, when a magnetic field is applied to the magnetic working substance (24) to cause the magnetocaloric effect, the portion of the case (21) made of the magnetic material can be used as part of the magnetic path.

In addition, the magnetic refrigeration module (20) of the present embodiment includes the short-circuit blocking portions (39 to 42) that block a short circuit of the applied magnetic field via the case (21). Since the applied magnetic field is blocked from being short-circuited via the case (21), the magnetic field can efficiently act on the magnetic working substance (24).

In the magnetic refrigeration module (20) of the present embodiment, the short-circuit blocking portions (39 to 42) are comprised of the first and second non-magnetic portions (39, 40) arranged between the portions of the case (21) made of the magnetic material. Thus, the first and second non-magnetic portions (39, 40) block the short circuit of the magnetic field via the case (21).

In addition, in the magnetic refrigeration module (20) of the present embodiment, portions of the case (21) facing outer surfaces of the housing (22) that do not face both ends of the flow path (23) (i.e., the first and second non-magnetic portions (39, 40)) have a lower thermal conductivity than the other portion. If a portion having a high thermal conductivity is present between both ends of the flow path (23), undesirable heat transfer occurs via the portion, i.e., heat transfer that would be a loss from the high-temperature side to the low-temperature side occurs. On the other hand, in the present embodiment, the portion of the case (21) between both ends of the flow path (23) has a low thermal conductivity, which blocks the heat transfer from the high-temperature side to the low-temperature side via the case (21).

First Variation of First Embodiment

A first variation of the first embodiment will be described below. This variation differs from the first embodiment in the direction in which the heating medium flows in the magnetic refrigeration module (20), the position of each slit (31, 33, 35, 37), the direction of the magnetic field applied to the housing (22), and the configuration of the case (21). Thus, differences from the first embodiment will be mainly described below.

Figure 4:
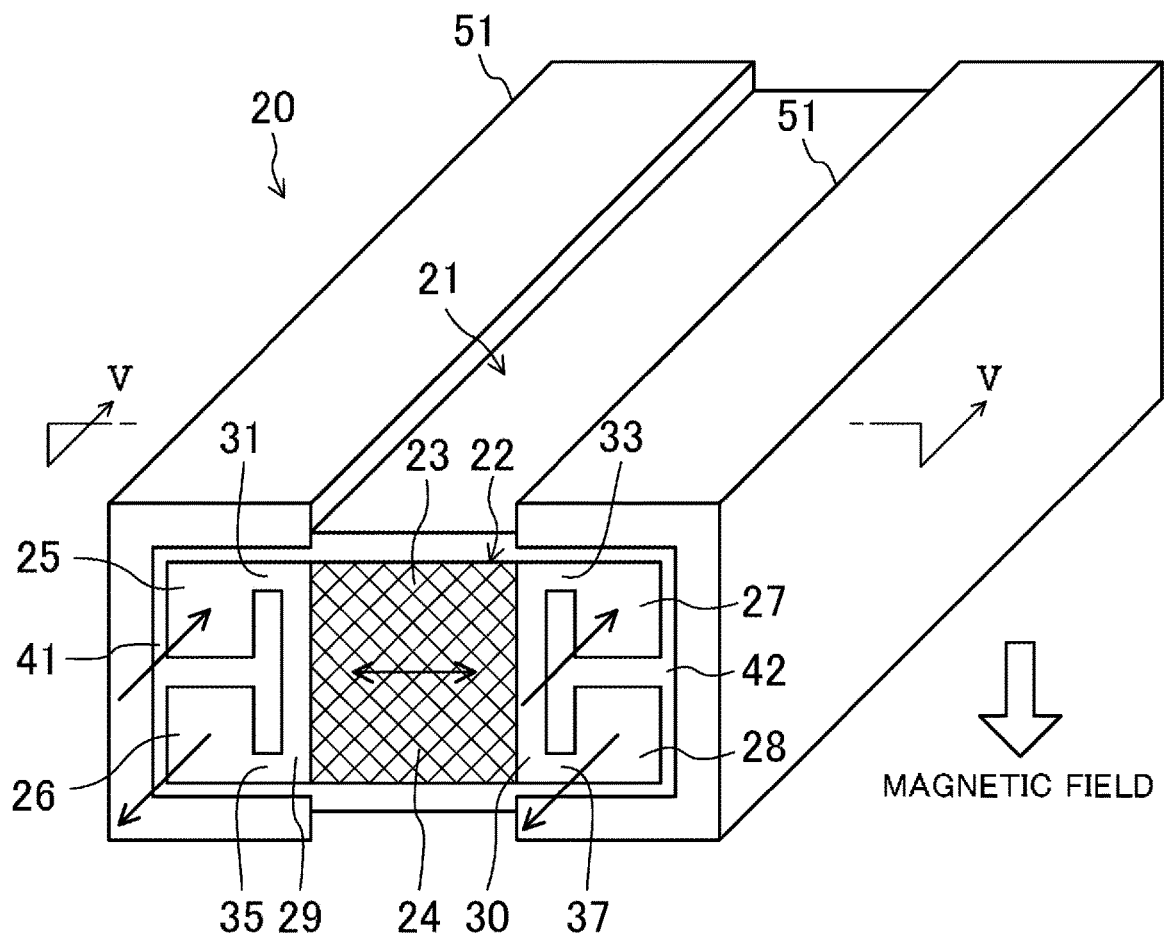
FIG. 4 is a perspective view schematically illustrating a configuration of a magnetic refrigeration module according to a first variation of the first embodiment.
Figure 5:
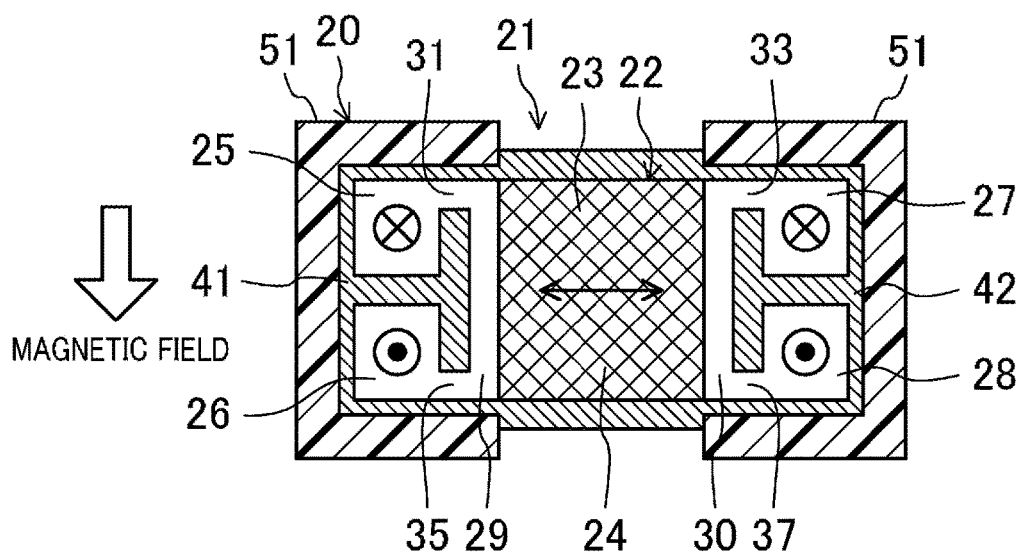
FIG. 5 is a cross-sectional view taken along line V-V of FIG. 4.

FIG. 4 is a perspective view schematically showing a configuration of a magnetic refrigeration module (20) of the present variation. FIG. 5 is a cross-sectional view taken along line V-V of FIG. 4. As shown in the figures, the low-temperature inflow path (25), the high-temperature inflow path (27), the low-temperature outflow path (26), and the high-temperature outflow path (28) have sealed ends on the rear side in FIGS. 4 and 5, and open ends on the front side in the same figures.

The front end of the low-temperature inflow path (25) is connected to the first outflow port (62) of the low-temperature heat exchanger (60) via a heating medium pipe. The heating medium flows through the low-temperature inflow path (25) from the front side to the rear side in FIGS. 4 and 5 (see an arrow in FIG. 4 and a symbol in FIG. 5).

The front end of the high-temperature inflow path (27) is connected to the second outflow port (72) of the high-temperature heat exchanger (70) via a heating medium pipe. The heating medium flows through the high-temperature inflow path (27) from the front side to the rear side in FIGS. 4 and 5 (see an arrow in FIG. 4 and a symbol in FIG. 5).

The front end of the low-temperature outflow path (26) is connected to the first inflow port (61) of the low-temperature heat exchanger (60) via a heating medium pipe. The heating medium flows through the low-temperature outflow path (26) from the rear side to the front side in FIGS. 4 and 5 (see an arrow in FIG. 4 and a symbol in FIG. 5).

The front end of the high-temperature outflow path (28) is connected to the second inflow port (71) of the high-temperature heat exchanger (70) via a heating medium pipe. The heating medium flows through the high-temperature outflow path (28) from the rear side to the front side in FIGS. 4 and 5 (see an arrow in FIG. 4 and a symbol in FIG. 5).

The first slit (31) and the third slit (35) are arranged near the ends of the housing (22) in a direction perpendicular to the general flow direction of the heating medium in the flow path (23) of the housing (22) (i.e., the vertical direction in FIG. 5). Specifically, the first slit (31) allows an upper end of the low-temperature inflow path (25) arranged in the upper half of the magnetic refrigeration module (20) to communicate with an upper end of the first space (29). The third slit (35) allows a lower end of the low-temperature outflow path (26) arranged in the lower half of the magnetic refrigeration module (20) to communicate with a lower end of the first space (29).

The second slit (33) and the fourth slit (37) are arranged near the ends of the housing (22) in the direction perpendicular to the general flow direction of the heating medium in the flow path (23) of the housing (22). Specifically, the second slit (33) allows an upper end of the high-temperature inflow path (27) arranged in the upper half of the magnetic refrigeration module (20) to communicate with an upper end of the second space (30). The fourth slit (37) allows a lower end of the high-temperature outflow path (28) arranged in the lower half of the magnetic refrigeration module (20) to communicate with a lower end of the second space (30).

The housing (22) is configured to be applied with a magnetic field in the vertical direction in FIGS. 4 and 5. Thus, the first space (29) and the second space (30) are arranged to sandwich the housing (22) in a direction perpendicular to the direction of the magnetic field applied to the housing (22).

The case (21) is substantially entirely made of a magnetic material (e.g., an electromagnetic steel sheet). The case (21) has a portion surrounding the low-temperature inflow and outflow paths (25, 26) (i.e., a left portion in FIGS. 4 and 5) and a portion surrounding the high-temperature inflow and outflow paths (27, 28) (i.e., a right portion in FIGS. 4 and 5), both of which are relatively thinned in the case (21). Specifically, the case (21) has first and second thin portions (41, 42) which are thinner than portions above and below the housing (22). The case (21) has the first thin portion (41) on the left in FIGS. 4 and 5 and the second thin portion (42) on the right in the same figures. The first and second thin portions (41, 42) are configured to cause magnetic saturation due to a magnetic field, if applied to the housing (22). Each of the first and second thin portions (41, 42) constitutes the short-circuit blocking portion.

A thermal insulator (51) covers the portion surrounding the low-temperature inflow and outflow paths (25, 26) and the portion surrounding the high-temperature inflow and outflow paths (27, 28) of the case (21). This makes it possible to reduce undesirable heat transfer of the heating medium flowing through the magnetic refrigeration module (20) with the outside air. The case (21) may be entirely covered with the thermal insulator (51).

Advantages of First Variation of First Embodiment

The magnetic refrigeration module (20) of the present variation provides the same advantages as those of the first embodiment.

In the magnetic refrigeration module (20) of the present variation, the housing (22) is configured to be applied with a magnetic field, and the first space (29) and the second space (30) are arranged to sandwich the housing (22) in the direction perpendicular to the direction of the magnetic field applied to the housing (22). The magnetic working substance (24) generates heat when the magnetic field is applied to the housing (22), and absorbs heat when the magnetic field is removed from the housing (22). In addition, both of the general direction in which the heating medium flows from the first space (29) to the second space (30) via the housing (22) and the general direction in which the heating medium flows in the reverse direction are substantially perpendicular to the direction of the magnetic field applied to the housing (22).

In the magnetic refrigeration module (20) of the present variation, the direction in which the heating medium flows into the low-temperature inflow path (25) and the direction in which the heating medium flows into the high-temperature inflow path (27) are the same, and the direction in which the heating medium flows out of the low-temperature outflow path (26) and the direction in which the heating medium flows out of the high-temperature outflow path (28) are the same. Therefore, the low-temperature inflow and outflow paths (25, 26) and the high-temperature inflow and outflow paths (27, 28) can be arranged on the same side of the magnetic refrigeration module (20). That is, all of these paths can be arranged on the same side of the magnetic refrigeration module (20).

In addition, the magnetic refrigeration module (20) of the present variation includes the third slit (35) communicating with the first space (29) and the low-temperature outflow path (26), and the fourth slit (37) communicating with the second space (30) and the high-temperature outflow path (28). The first and second slits (31, 33) are arranged near one end of the housing (22) in the direction perpendicular to the flow direction of the heating medium in the flow path (23), and the third and fourth slits (35, 37) are arranged near the other end of the housing (22) in the direction perpendicular to the flow direction of the heating medium in the flow path (23). Therefore, in the magnetic refrigeration module (20), the heating medium flows through the low-temperature inflow path (25), the first slit (31), the first space (29), the flow path (23) in the housing (22), the second space (30), the fourth slit (37), and the high-temperature outflow path (28) in this order, or through the high-temperature inflow path (27), the second slit (33), the second space (30), the flow path (23) in the housing (22), the first space (29), the third slit (35), and the low-temperature outflow path (26) in this order. In the former case, the distance from the first space (29) to the second space (30) between the first slit (31) and the fourth slit (37) is substantially uniform, which causes the heating medium to easily and uniformly flow from the first slit (31) to the fourth slit (37). This also applies to the flow of the heating medium from the second slit (33) to the third slit (35) in the latter case.

In the magnetic refrigeration module (20) of the present variation, the short-circuit blocking portions (39 to 42) are comprised of the first and second thin portions (41, 42) that are relatively thinned in the case (21) and which cause magnetic saturation due to the magnetic field. Therefore, the first and second thin portions (41, 42) block the short circuit of the magnetic field via the case (21).

Second Variation of First Embodiment

A second variation of the first embodiment will be described below. This variation is different from the first embodiment in the direction in which the heating medium flows in the magnetic refrigeration module (20) and the configuration of first to fourth intermediate flow paths (31 to 38). Thus, differences from the first embodiment will be mainly described below.

Figure 6:
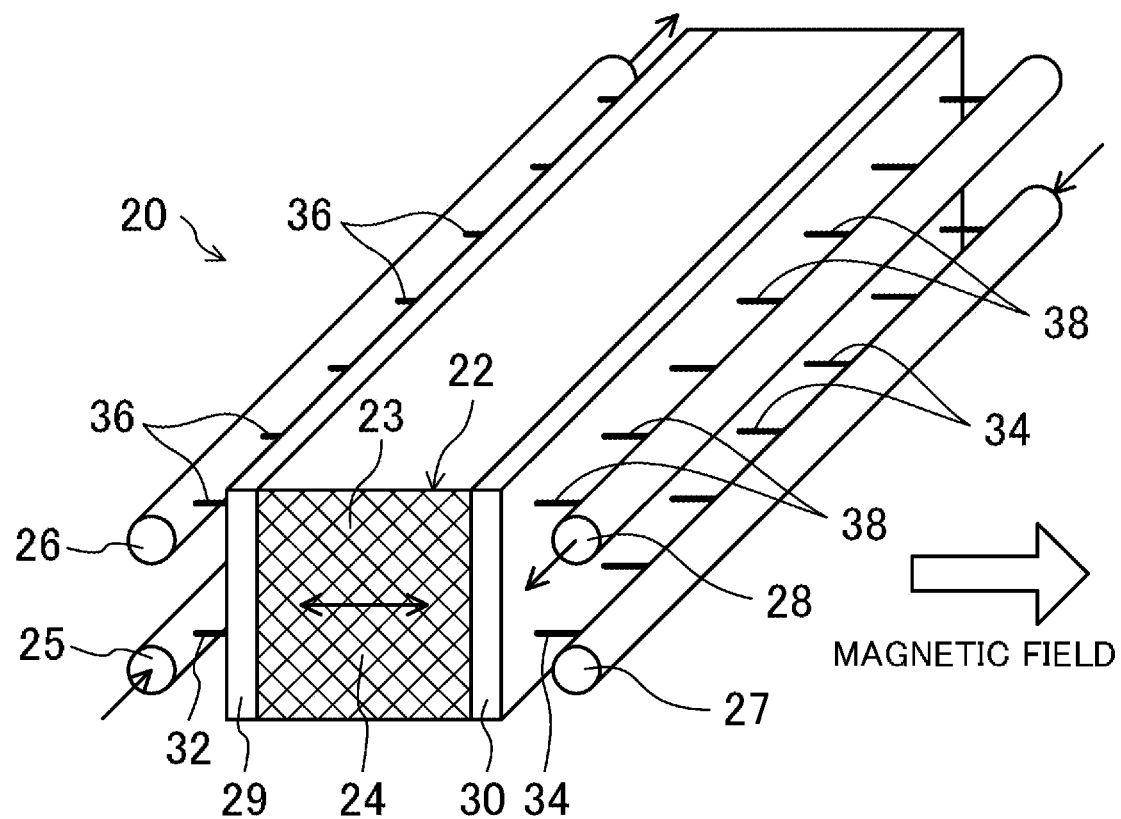
FIG. 6 is a perspective view schematically illustrating a configuration of a magnetic refrigeration module according to a second variation of the first embodiment.

FIG. 6 is a perspective view schematically illustrating a configuration of a magnetic refrigeration module of the present variation. As shown in this figure, the low-temperature inflow path (25) and the high-temperature outflow path (28) have sealed ends on the rear side in FIG. 6, and open ends on the front side in the same figure. The high-temperature inflow path (27) and the low-temperature outflow path (26) have sealed ends on the front side in FIG. 6, and open ends on the rear side in the same figure.

The front end of the low-temperature inflow path (25) is connected to the first outflow port (62) of the low-temperature heat exchanger (60) via a heating medium pipe. The heating medium flows through the low-temperature inflow path (25) from the front side to the rear side in FIG. 6 (see an arrow in FIG. 6).

The rear end of the high-temperature inflow path (27) is connected to the second outflow port (72) of the high-temperature heat exchanger (70) via a heating medium pipe. The heating medium flows through the high-temperature inflow path (27) from the rear side to the front side in FIG. 6 (see an arrow in FIG. 6).

The rear end of the low-temperature outflow path (26) is connected to the first inflow port (61) of the low-temperature heat exchanger (60) via a heating medium pipe. The heating medium flows through the low-temperature outflow path (26) from the front side to the rear side in FIG. 6 (see an arrow in FIG. 6).

The front end of the high-temperature outflow path (28) is connected to the second inflow port (71) of the high-temperature heat exchanger (70) via a heating medium pipe. The heating medium flows through the high-temperature outflow path (28) from the rear side to the front side in FIG. 6 (see an arrow in FIG. 6).

As shown in FIG. 6, each of the first to fourth intermediate flow paths (31 to 38) is comprised of a plurality of pipe bodies (32, 34, 36, 38). Specifically, a plurality of first pipe bodies (32) communicating with the low-temperature inflow path (25) and the first space (29) constitutes the first intermediate flow path; a plurality of second pipe bodies (34) communicating with the high-temperature inflow path (27) and the second space (30) constitutes the second intermediate flow path; a plurality of third pipe bodies (36) communicating with the low-temperature outflow path (26) and the first space (29) constitutes the third intermediate flow path; and a plurality of fourth pipe bodies (38) communicating with the high-temperature outflow path (28) and the second space (30) constitutes the fourth intermediate flow path. The first to fourth pipe bodies (32, 34, 36, 38) are arranged at equal intervals along the entire length of the magnetic refrigeration module (20) in the longitudinal direction.

Advantages of Second Variation of First Embodiment

The magnetic refrigeration module (20) of the present variation provides the same advantages as those of the first embodiment.

In the magnetic refrigeration module (20) of the present variation, the first to fourth intermediate flow paths (31 to 38) are made of a plurality of first to fourth pipe bodies (32, 34, 36, 38). Thus, the flow of the heating medium heading to the first space (29) or the second space (30) is expanded by the plurality of first to fourth pipe bodies (32, 34, 36, 38). Specifically, the flow of the heating medium is expanded in a range where the plurality of first to fourth pipe bodies (32, 34, 36, 38) are present.

In the magnetic refrigeration module (20) of the present variation, the direction in which the heating medium flows into the low-temperature inflow path (25) and the direction in which the heating medium flows out of the low-temperature outflow path (26) are the same, and the direction in which the heating medium flows into the high-temperature inflow path (27) and the direction in which the heating medium flows out of the high-temperature outflow path (28) are the same. Therefore, an inlet of the low-temperature inflow path (25) and an outlet of the low-temperature outflow path (26) can be arranged on the opposite sides of the magnetic refrigeration module (20). Further, an inlet of the high-temperature inflow path (27) and an outlet of the high-temperature outflow path (28) can be arranged on the opposite sides of the magnetic refrigeration module (20).

Second Embodiment

A second embodiment will be described below. A magnetic refrigeration module (20) of this embodiment is different from that of the first embodiment in that it includes a plurality of housings (22), a plurality of inflow paths (25, 27), and a plurality of outflow paths (26, 28). Thus, differences from the first embodiment will be mainly described below.

Figure 7:
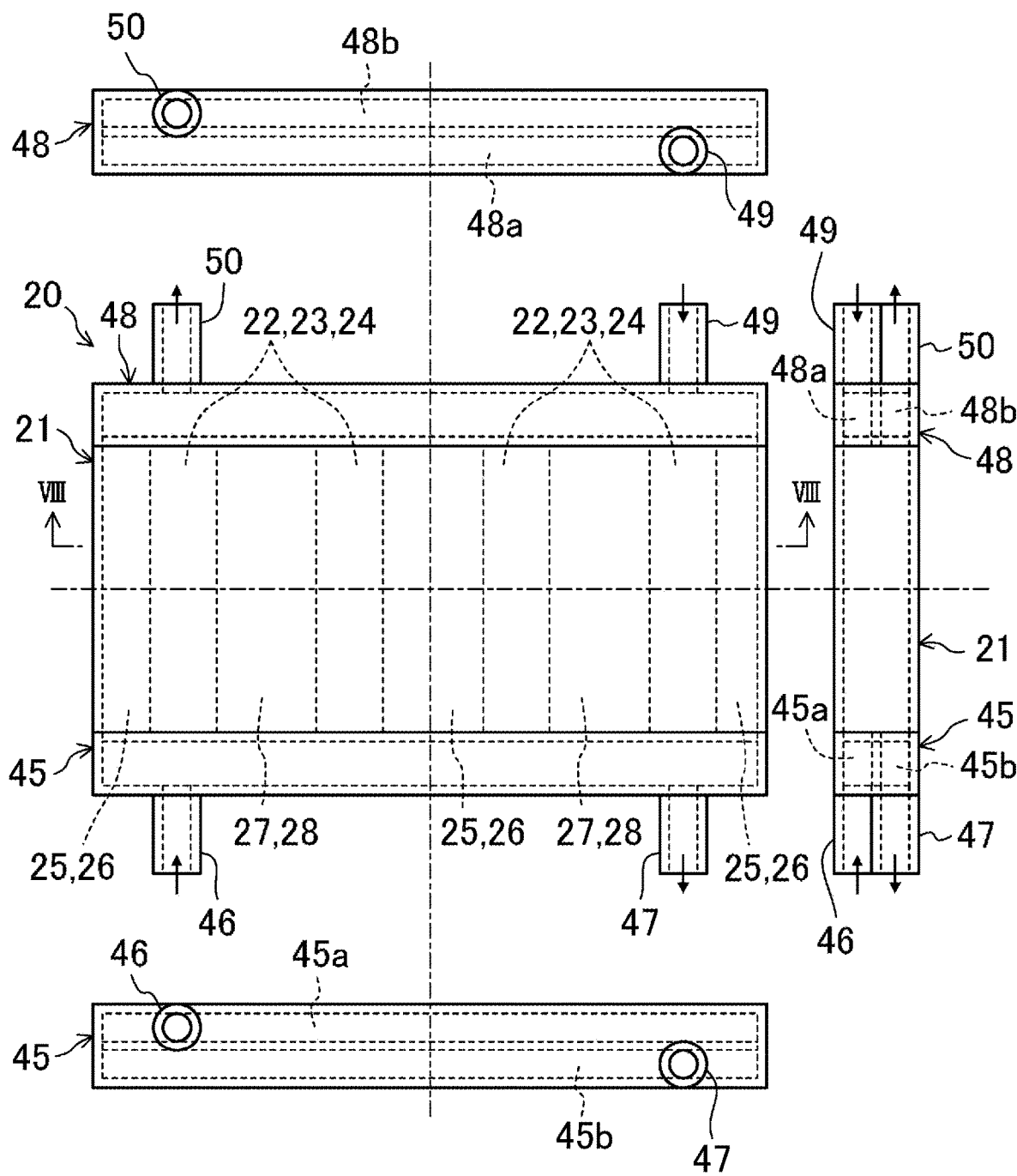
FIG. 7 is four orthogonal views schematically illustrating a configuration of a magnetic refrigeration module of a second embodiment.
Figure 8:
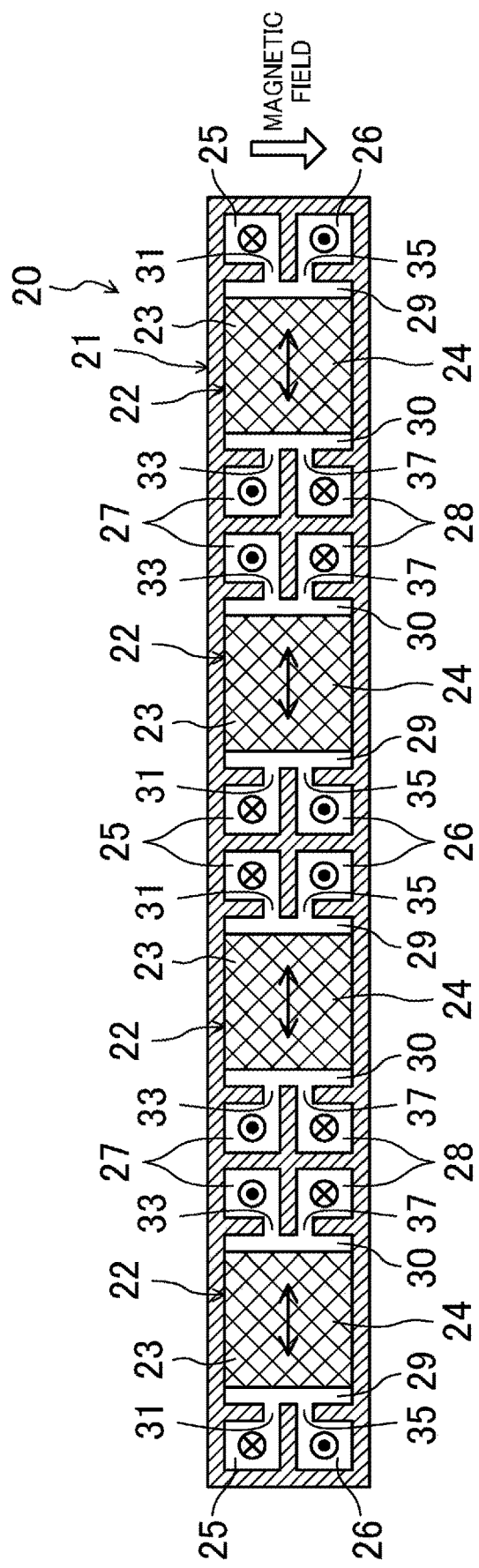
FIG. 8 is a cross-sectional view taken along line VIII-VIII of FIG. 7.

FIG. 7 is four orthogonal views schematically illustrating a configuration of a magnetic refrigeration module (20) of the present embodiment. Specifically, FIG. 7 shows a plan view of the magnetic refrigeration module (20) at the center, a front view of the magnetic refrigeration module (20) below the plan view, a rear view of the magnetic refrigeration module (20) above the plan view, and a right side view of the magnetic refrigeration module (20) on the right of the plan view (the same applies to FIGS. 9, 11, and 15). FIG. 8 is a cross-sectional view taken along line VIII-VIII of FIG. 7.

As shown in the above figures, the magnetic refrigeration module (20) includes a plurality of (four in this example) housings (22). The magnetic refrigeration module (20) has a low-temperature inflow path (25), a high-temperature inflow path (27), a low-temperature outflow path (26), and a high-temperature outflow path (28) for each of the housings (22). Specifically, in this example, the magnetic refrigeration module (20) includes four low-temperature inflow paths (25), four high-temperature inflow paths (27), four low-temperature outflow paths (26), and four high-temperature outflow paths (28).

The plurality of housings (22) are arranged side by side in the left-right direction in FIG. 8. The low-temperature inflow and outflow paths (25, 26) and the high-temperature inflow and outflow paths (27, 28) are arranged side by side in the direction in which the housings (22) are arranged side by side. Here, two high-temperature inflow paths (27) and two high-temperature outflow paths (28), or two low-temperature inflow paths (25) and two low-temperature outflow path (26), are arranged between the adjacent housings (22). Thus, the low-temperature inflow and outflow paths (25, 26) and the high-temperature inflow and outflow paths (27, 28) can be arranged away from each other, which can block undesirable heat transfer between them.

As shown in FIG. 7, the magnetic refrigeration module (20) includes a low-temperature header (45), a high-temperature header (48), a low-temperature inflow pipe (46), a low-temperature outflow pipe (47), a high-temperature inflow pipe (49), and a high-temperature outflow pipe (50).

The low-temperature header (45) is provided on the front side of the magnetic refrigeration module (20). The inside of the low-temperature header (45) has an upper portion formed as a low-temperature inflow chamber (45a) and a lower portion formed as a low-temperature outflow chamber (45b). The low-temperature inflow chamber (45a) communicates with all the low-temperature inflow paths (25) and the low-temperature inflow pipe (46). The low-temperature outflow chamber (45b) communicates with all the low-temperature outflow paths (26) and the low-temperature outflow pipe (47).

The high-temperature header (48) is provided on the rear side of the magnetic refrigeration module (20). The inside of the high-temperature header (48) has an upper portion formed as a high-temperature inflow chamber (48a) and a lower portion formed as a high-temperature outflow chamber (48b). The high-temperature inflow chamber (48a) communicates with all the high-temperature inflow paths (27) and the high-temperature inflow pipe (49). The high-temperature outflow chamber (48b) communicates with all the high-temperature outflow paths (28) and the high-temperature outflow pipe (50).

An inlet of the low-temperature inflow pipe (46) is connected to the first outflow port (62) of the low-temperature heat exchanger (60) via a heating medium pipe. An outlet of the low-temperature outflow pipe (47) is connected to the first inflow port (61) of the low-temperature heat exchanger (60) via a heating medium pipe. An inlet of the high-temperature inflow pipe (49) is connected to the second outflow port (72) of the high-temperature heat exchanger (70) via a heating medium pipe. An outlet of the high-temperature outflow pipe (50) is connected to the second inflow port (71) of the high-temperature heat exchanger (70) via a heating medium pipe.

Flow of Heating Medium in Magnetic Refrigeration Module

When the heating medium pump (80) performs the first operation in the magnetic refrigeration module (20), the heating medium flows through the low-temperature inflow pipe (46), the low-temperature inflow chamber (45a), the low-temperature inflow path (25), the first slit (31), the first space (29), the flow path (23) in the housing (22), the second space (30), the fourth slit (37), the high-temperature outflow path (28), the high-temperature outflow chamber (48b), and the high-temperature outflow pipe (50) in this order. On the other hand, when the heating medium pump (80) performs the second operation in the magnetic refrigeration module (20), the heating medium flows through the high-temperature inflow pipe (49), the high-temperature inflow chamber (48a), the high-temperature inflow path (27), the second slit (33), the second space (30), the flow path (23) in the housing (22), the first space (29), the third slit (35), the low-temperature outflow path (26), the low-temperature outflow chamber (45b), and the low-temperature outflow pipe (47) in this order.

Advantages of Second Embodiment

The magnetic refrigeration module (20) of the present embodiment provides the same advantages as those of the first embodiment.

In the magnetic refrigeration module (20) of the present embodiment, the housings (22) are arranged side by side, and the low-temperature inflow paths (25) or the low-temperature outflow paths (26) and the high-temperature inflow paths (27) or the high-temperature outflow paths (28) are arranged side by side in the direction in which the housings (22) are arranged side by side. This provides plural sets of the low-temperature inflow path (25), the low-temperature outflow path (26), the high-temperature inflow path (27), the high-temperature outflow path (28), and the housing (22).

Further, in the magnetic refrigeration module (20) of the present embodiment, the housings (22) are arranged side by side in the flow direction of the heating medium in the flow path (23), and the low-temperature inflow path (25) and the low-temperature outflow path (26) or the high-temperature inflow path (27) and the high-temperature outflow path (28) are arranged between the housings (22) arranged side by side. Thus, the low-temperature inflow path (25) and the low-temperature outflow path (26) or the high-temperature inflow path (27) and the high-temperature outflow path (28) can be arranged between the housings (22) arranged side by side. Therefore, the high-temperature inflow and outflow paths (27, 28) and the low-temperature inflow and outflow paths (25, 26) can be arranged away from each other, which can block undesirable heat transfer from the former to the latter.

Third Embodiment

A third embodiment will be described below. A magnetic refrigeration module (20) of this embodiment is different from that of the second embodiment in the arrangement of the low-temperature inflow and outflow paths (25, 26) and the high-temperature inflow and outflow paths (27, 28), and the configuration of the case (21). Thus, differences from the second embodiment will be mainly described below.

Figure 9:
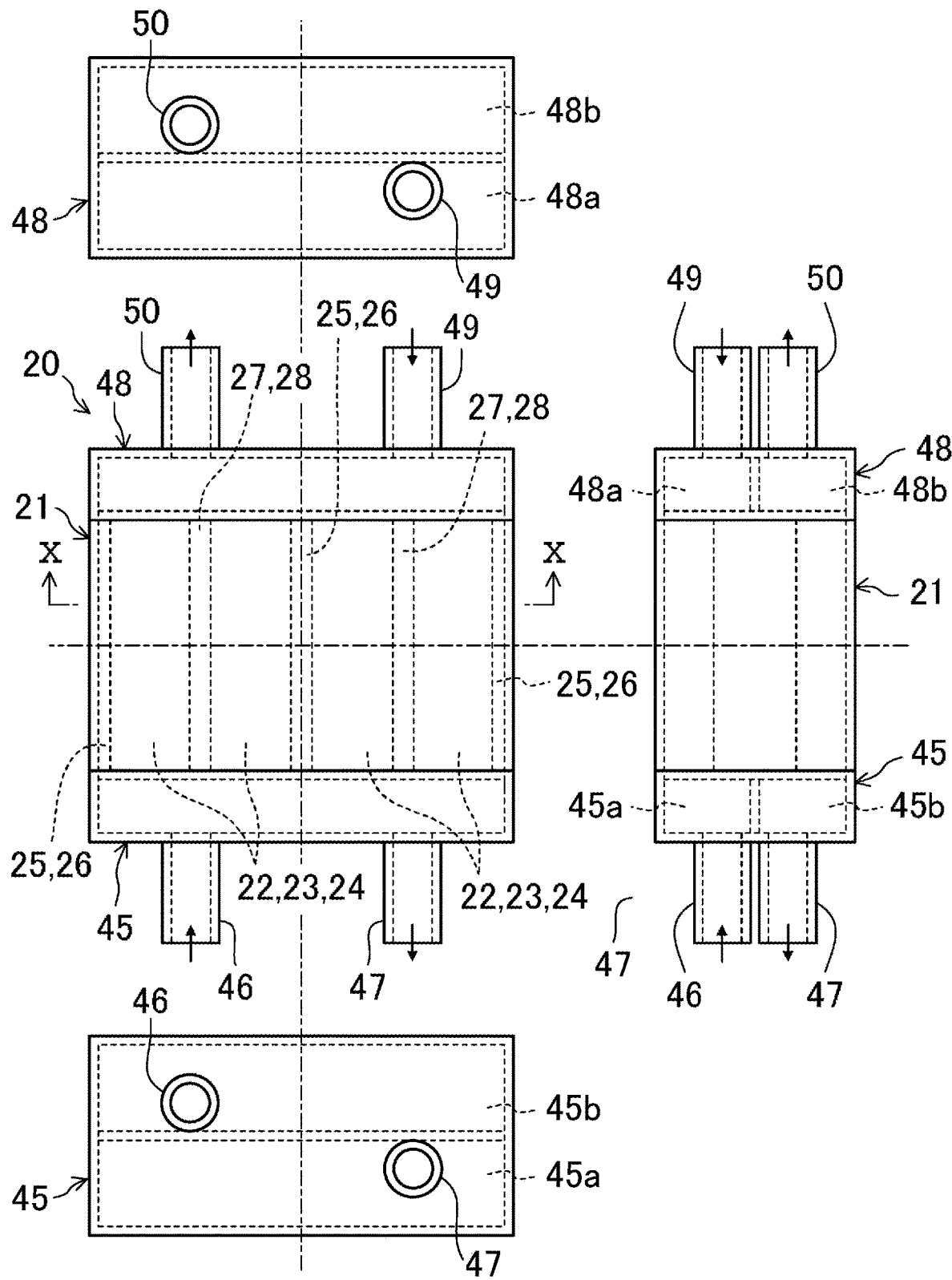
FIG. 9 is four orthogonal views schematically illustrating a configuration of a magnetic refrigeration module of a third embodiment.
Figure 10:
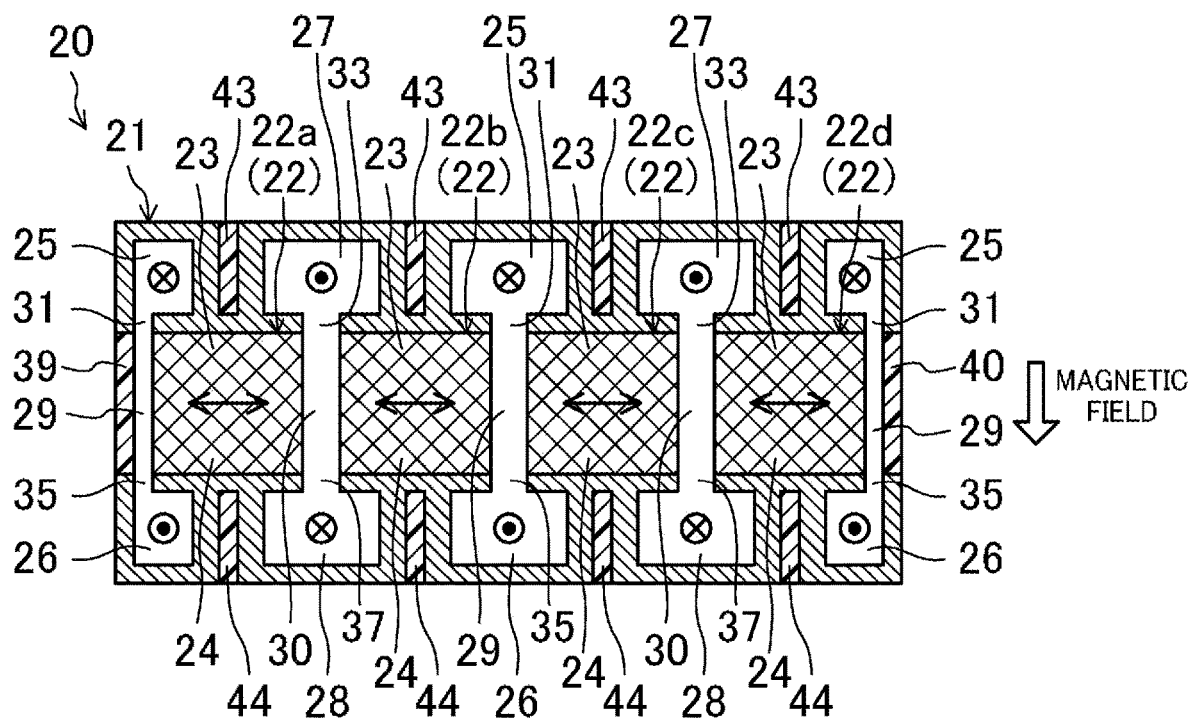
FIG. 10 is a cross-sectional view taken along line X-X of FIG. 9.

FIG. 9 is four orthogonal views schematically illustrating a configuration of a magnetic refrigeration module (20) of the present embodiment. FIG. 10 is a cross-sectional view taken along line X-X of FIG. 9.

As shown in the above figures, the magnetic refrigeration module (20) includes a plurality of (four in this example) housings (22a to 22d). The housings (22a to 22d) are arranged side by side in the left-right direction in FIG. 10. In the present embodiment, the housings (22a to 22d) may also be referred to as first to fourth housings (22a to 22d) in the order from left to right in FIG. 10.

The low-temperature inflow paths (25) are provided in an upper portion of the case (21). Specifically, the low-temperature inflow paths (25), three in total, are provided, i.e., one at the upper left of the first housing (22a), one above and between the second housing (22b) and the third housing (22c), and one at the upper right of the fourth housing (22d).

The low-temperature outflow paths (26) are provided in a lower portion of the case (21). Specifically, the low-temperature outflow paths (26), three in total, are provided, i.e., one at the lower left of the first housing (22a), one below and between the second housing (22b) and the third housing (22c), and one at the lower right of the fourth housing (22d).

The high-temperature inflow paths (27) are provided in the upper portion of the case (21). Specifically, the high-temperature inflow paths (27), two in total, are provided, i.e., one above and between the first housing (22a) and the second housing (22b), and one above and between the third housing (22c) and the fourth housing (22d).

The high-temperature outflow paths (28) are provided in the lower portion of the case (21). Specifically, the high-temperature outflow paths (28), two in total, are provided, i.e., one below and between the first housing (22a) and the second housing (22b), and one below and between the third housing (22c) and the fourth housing (22d).

A portion of the case (21) above the housings (22a to 22d) and a portion of the case (21) below the housings (22a to 22d) are made of a magnetic material (e.g., an electromagnetic steel plate). The case (21) includes a plurality of (four in this example) first thermal insulator portions (43) each of which is provided between the low-temperature inflow path (25) and the high-temperature inflow path (27). The case (21) also includes a plurality of (four in this example) second thermal insulator portions (44) each of which is provided between the low-temperature outflow path (26) and the high-temperature outflow path (28). The first and second thermal insulator portions (43, 44) are made of a material having a lower thermal conductivity than the magnetic material. The first and second thermal insulator portions (43, 44) may be air layers.

Advantages of Third Embodiment

The magnetic refrigeration module (20) of the present embodiment provides the same advantages as those of the second embodiment.

In the magnetic refrigeration module (20) of the present embodiment, the case (21) includes the first thermal insulator portions (43) each of which is provided between the low-temperature inflow path (25) and the high-temperature inflow path (27), and the second thermal insulator portions (44) each of which is provided between the low-temperature outflow path (26) and the high-temperature outflow path (28). Therefore, the first and second thermal insulator portions (43, 44) block undesirable heat transfer from the high-temperature inflow path (27) or the high-temperature outflow path (28) to the low-temperature inflow path (25) or the low-temperature outflow path (26).

Fourth Embodiment

A fourth embodiment will be described below. A magnetic refrigeration module (20) of this embodiment is different from that of the third embodiment in the arrangement of the low-temperature inflow and outflow paths (25, 26) and the high-temperature inflow and outflow paths (27, 28). Thus, differences from the third embodiment will be mainly described below.

Figure 11:
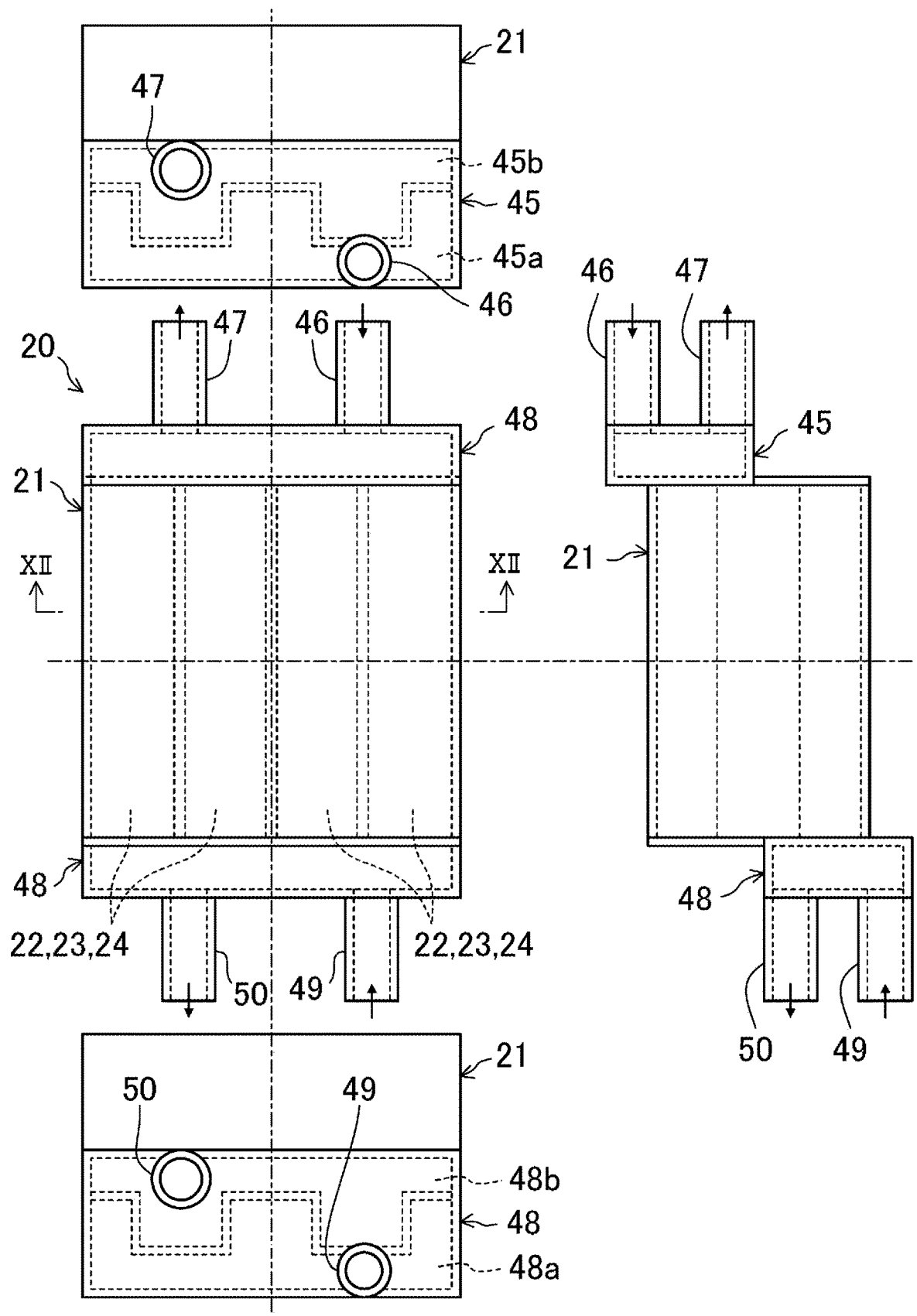
FIG. 11 is four orthogonal views schematically illustrating a configuration of a magnetic refrigeration module of a fourth embodiment.
Figure 12:
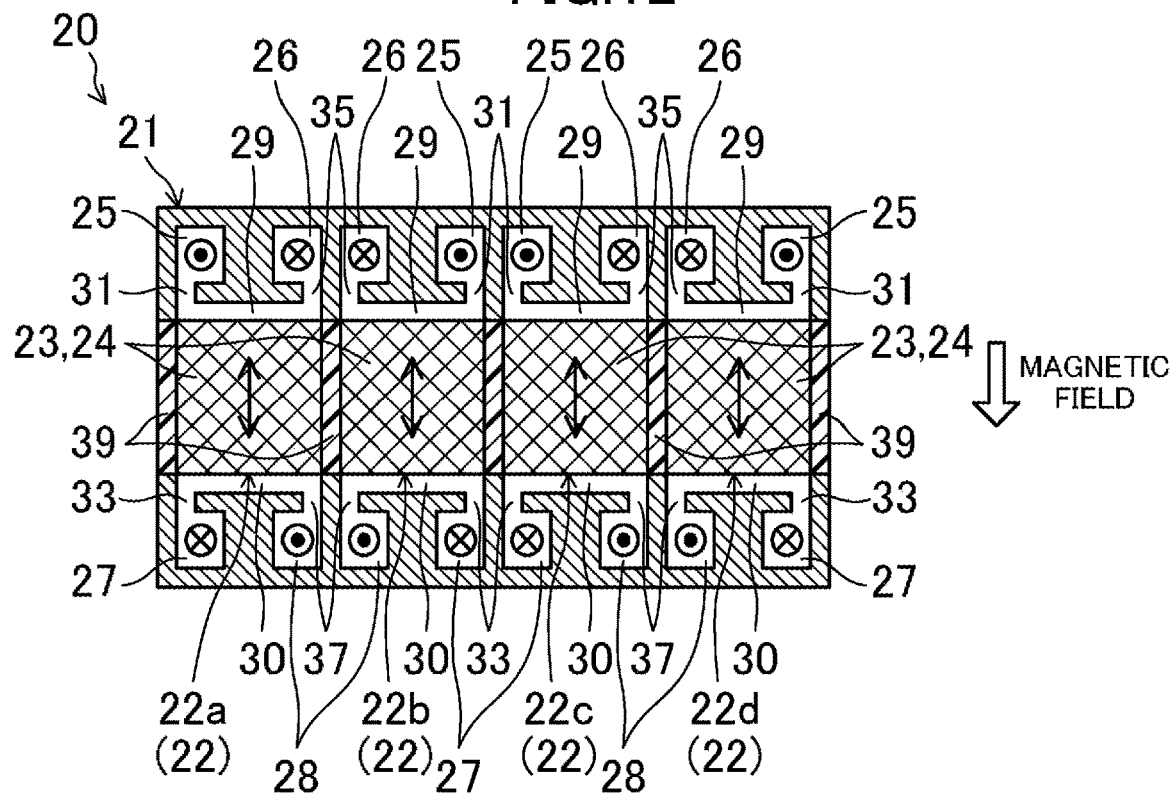
FIG. 12 is a cross-sectional view taken along line XII-XII of FIG. 11.

FIG. 11 is four orthogonal views schematically illustrating a configuration of the magnetic refrigeration module (20) of the present embodiment. FIG. 12 is a cross-sectional view taken along line XII-XII of FIG. 11.

As shown in the above figures, the magnetic refrigeration module (20) includes a plurality of (four in this example) housings (22a to 22d). The housings (22a to 22d) are arranged side by side in the left-right direction in FIG. 12. In the present embodiment, the housings (22a to 22d) may also be referred to as first to fourth housings (22a to 22d) in the order from left to right in FIG. 12.

The low-temperature inflow paths (25) and the low-temperature outflow paths (26) are provided in an upper portion of the case (21). Specifically, the low-temperature inflow paths (25), four in total, are provided, i.e., one at the upper left of each of the first and third housings (22a, 22c), and one at the upper right of each of the second and fourth housings (22b, 22d). Further, the low-temperature outflow paths (26), four in total, are provided, i.e., one at the upper right of each of the first and third housings (22a, 22c), and one at the upper left of each of the second and fourth housings (22b, 22d).

The high-temperature inflow paths (27) and the high-temperature outflow paths (28) are provided in a lower portion of the case (21). Specifically, the high-temperature inflow paths (27), four in total, are provided, i.e., one at the lower left of each of the first and third housings (22a, 22c), and one at the lower right of each of the second and fourth housings (22b, 22d). Further, the high-temperature outflow paths (28), four in total, are provided, i.e., one at the lower right of each of the first and third housings (22a, 22c), and one at the lower left of each of the second and fourth housings (22b, 22d).

A portion of the case (21) above the housings (22a to 22d) and a portion of the case (21) below the housings (22a to 22d) are made of a magnetic material (e.g., an electromagnetic steel plate). The case (21) has non-magnetic portions (39) made of a non-magnetic material between these portions made of the magnetic material, i.e., on the left and right of each of the housings (22a to 22d).

Advantages of Fourth Embodiment

The magnetic refrigeration module (20) of the present embodiment provides the same advantages as those of the third embodiment.

In the magnetic refrigeration module (20) of the present embodiment, the housings (22a to 22d) are arranged side by side in a direction intersecting with the flow direction of the heating medium in the flow path (23). The low-temperature inflow paths (25) and the low-temperature outflow paths (26) are arranged on one side of the housings (22a to 22d) in the flow direction, and the high-temperature inflow paths (27) and the high-temperature outflow paths (28) are arranged on the other side of the housings (22a to 22d) in the flow direction. Thus, the low-temperature inflow paths (25) and the low-temperature outflow paths (26) or the high-temperature inflow paths (27) and the high-temperature outflow paths (28) can be arranged on the one side or the other side of the housings (22a to 22d) in the flow direction of the heating medium in the flow path (23). Therefore, the high-temperature inflow and outflow paths (27, 28) and the low-temperature inflow and outflow paths (25, 26) can be arranged away from each other, which can block undesirable heat transfer from the former to the latter.

First Variation of Fourth Embodiment

A first variation of the fourth embodiment will be described below. A magnetic refrigeration module (20) of this variation is different from that of the fourth embodiment in that only a single housing (22) is provided, and that plural sets of the low-temperature inflow and outflow paths (25, 26) and the high-temperature inflow and outflow paths (27, 28) are provided for the single housing (22). Thus, differences from the fourth embodiment will be mainly described below.

Figure 13:
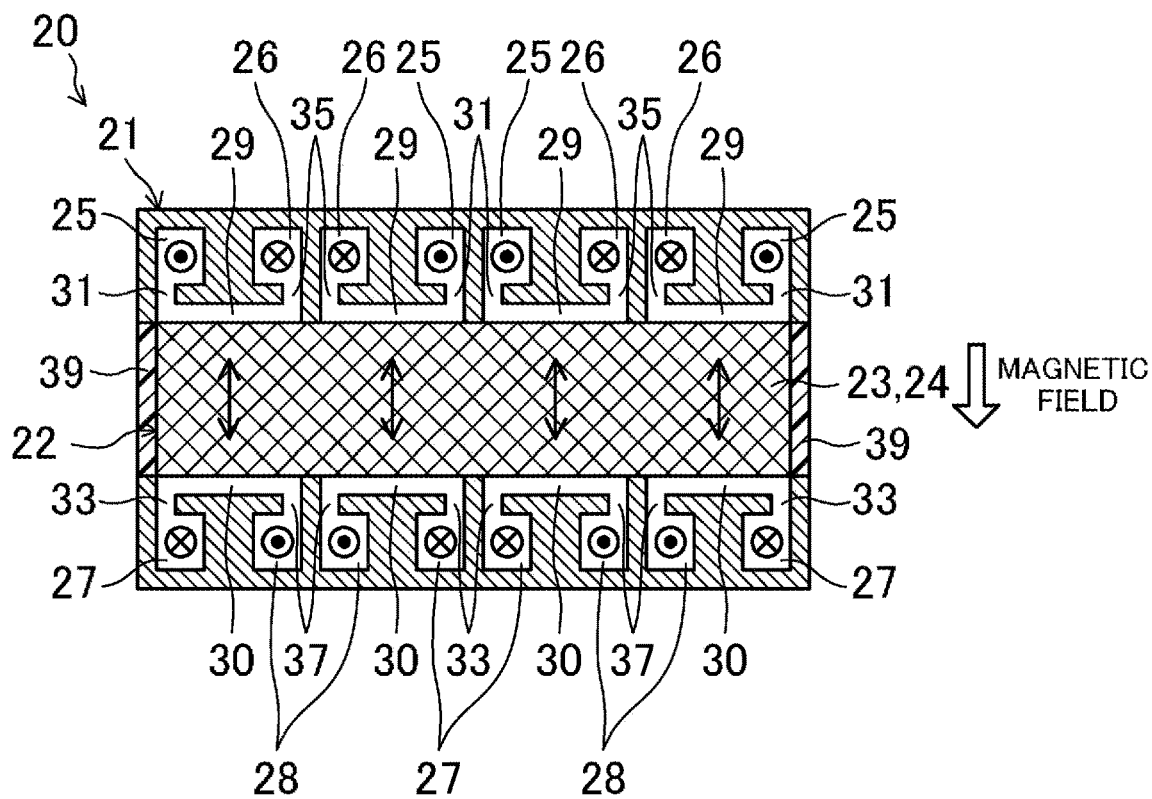
FIG. 13 is a view corresponding to FIG. 12, illustrating a magnetic refrigeration module of a first variation of the fourth embodiment.

FIG. 13 is a view corresponding to FIG. 12, showing the magnetic refrigeration module (20) of this variation. As shown in the figure, the magnetic refrigeration module (20) includes only one housing (22) extended in the width direction thereof (i.e., the left-right direction in FIG. 13). The number and arrangement of the low-temperature inflow and outflow paths (25, 26) and the high-temperature inflow and outflow paths (27, 28) are the same as those of the fourth embodiment. Thus, in the magnetic refrigeration module (20) of the present variation, plural sets (four sets in this example) of the low-temperature inflow and outflow paths (25, 26) and the high-temperature inflow and outflow paths (27, 28) are provided for the single housing (22).

Advantages of First Variation of Fourth Embodiment

The magnetic refrigeration module (20) of the present variation provides the same advantages as those of the fourth embodiment.

In the magnetic refrigeration module (20) of the present variation, plural sets of the low-temperature inflow path (25), the high-temperature inflow path (27), the low-temperature outflow path (26), and the high-temperature outflow path (28) are provided for the single housing (22). Therefore, the heating medium flows into the single housing (22) from the plurality of low-temperature inflow paths (25) or the plurality of high-temperature inflow paths (27), and flows out of the single housing (22) toward the plurality of low-temperature outflow paths (26) or the plurality of high-temperature outflow paths (28).

Second Variation of Fourth Embodiment

A second variation of the fourth embodiment will be described below. A magnetic refrigeration module (20) of this variation is different from that of the first variation of the fourth embodiment in the configuration of the low-temperature inflow and outflow paths (25, 26) and the high-temperature inflow and outflow paths (27, 28). Thus, differences from the first variation of the fourth embodiment will be mainly described below.

Figure 14:
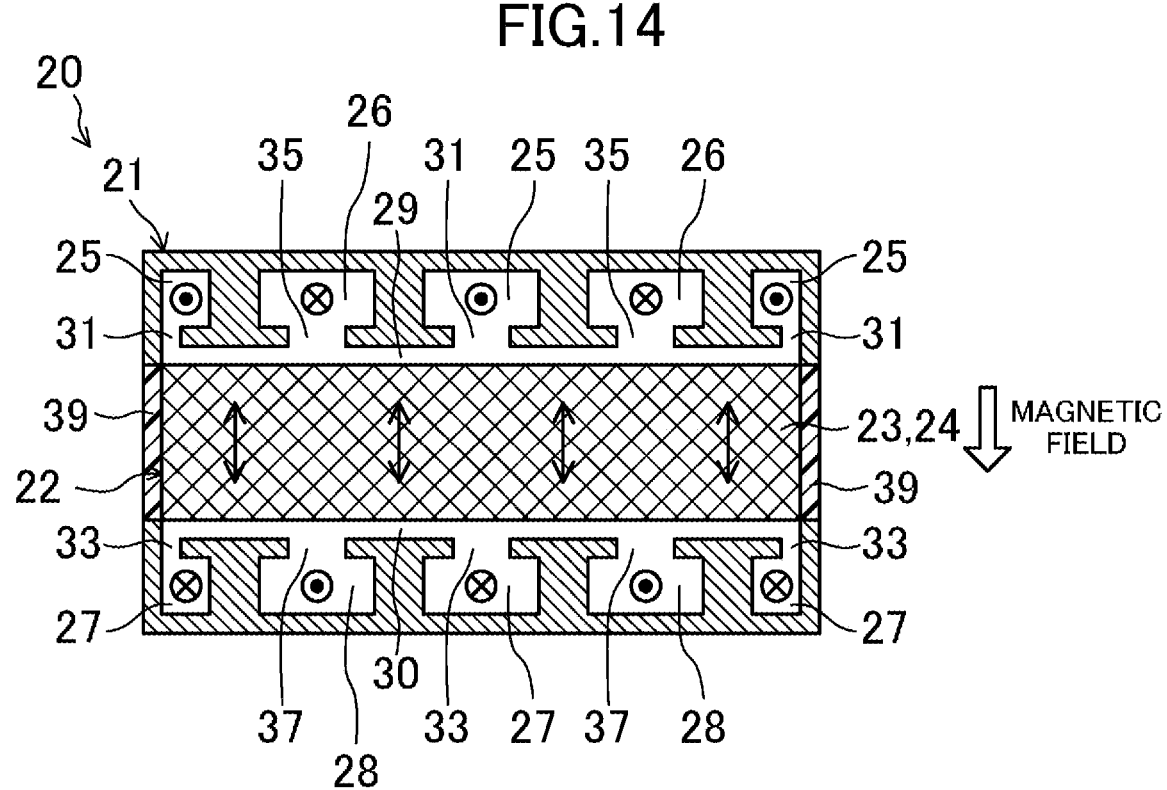
FIG. 14 is a view corresponding to FIG. 12, illustrating a magnetic refrigeration module of a second variation of the fourth embodiment.

FIG. 14 is a view corresponding to FIG. 12, showing the magnetic refrigeration module (20) of this variation. As shown in the figure, each of the inflow paths (25, 27) and outflow paths (26, 28) of the present variation is configured as a unified structure of the paths of the same type arranged adjacent to each other according to the first variation of the fourth embodiment (e.g., two low-temperature inflow paths (25) corresponding to the first and second housings (22a, 22b) are unified into a path).

This can facilitate the formation of the inflow paths (25, 27) and the outflow paths (26, 28). Further, compared to the first variation of the fourth embodiment, for example, the portion made of the magnetic material arranged between the two low-temperature inflow paths (25) corresponding to the first and second housings (22a, 22b) can be omitted. This can make the magnetic refrigeration module (20) compact in the width direction.

Fifth Embodiment

A fifth embodiment will be described below. A magnetic refrigeration module (20) of the present embodiment is different from the second variation of the fourth embodiment in the number and arrangement of the housings (22), the inflow paths (25, 27), and the outflow paths (26, 28). Thus, differences from the second variation of the fourth embodiment will be mainly described below.

Figure 15:
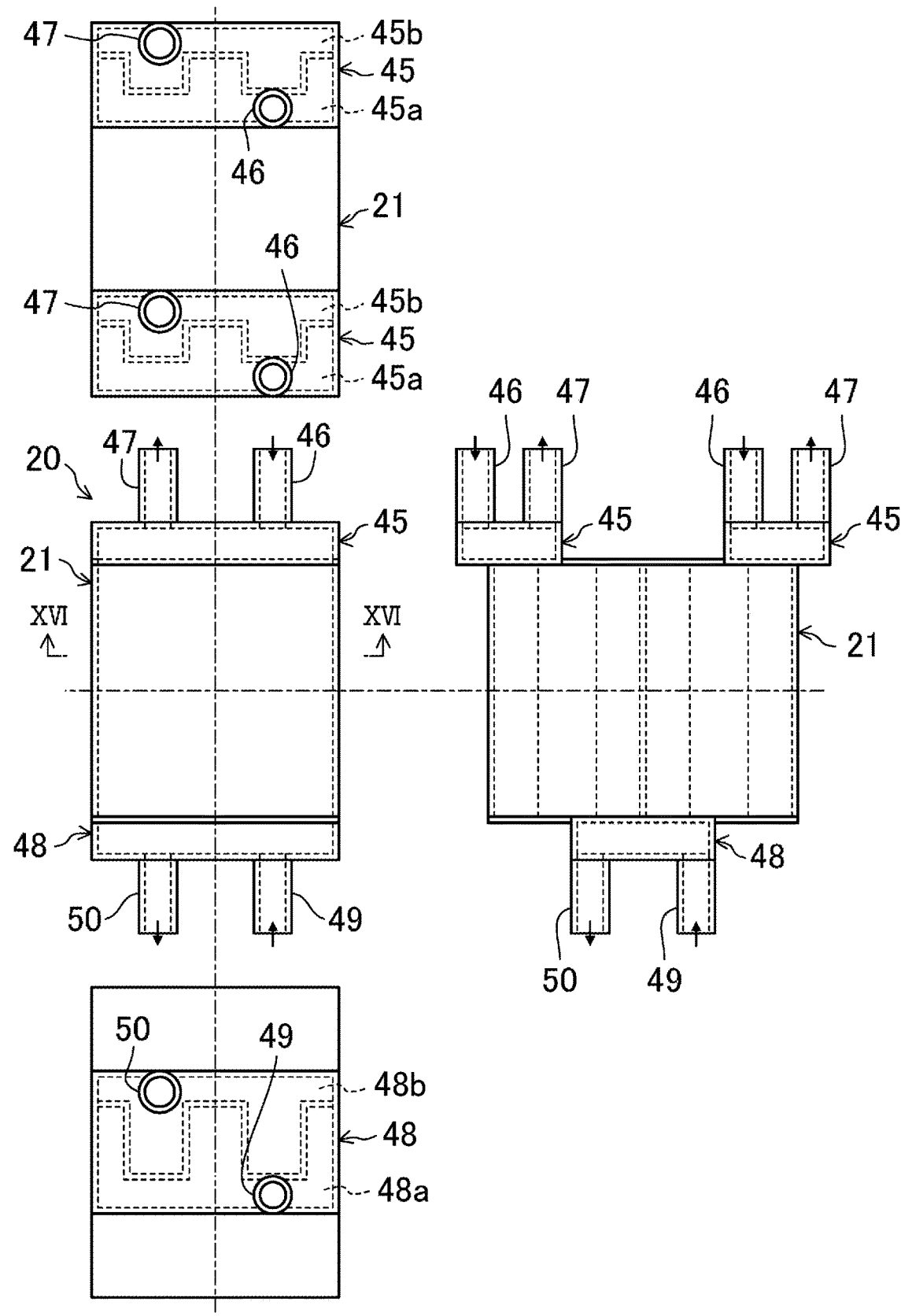
FIG. 15 is four orthogonal views schematically illustrating a configuration of a magnetic refrigeration module of a fifth embodiment.
Figure 16:
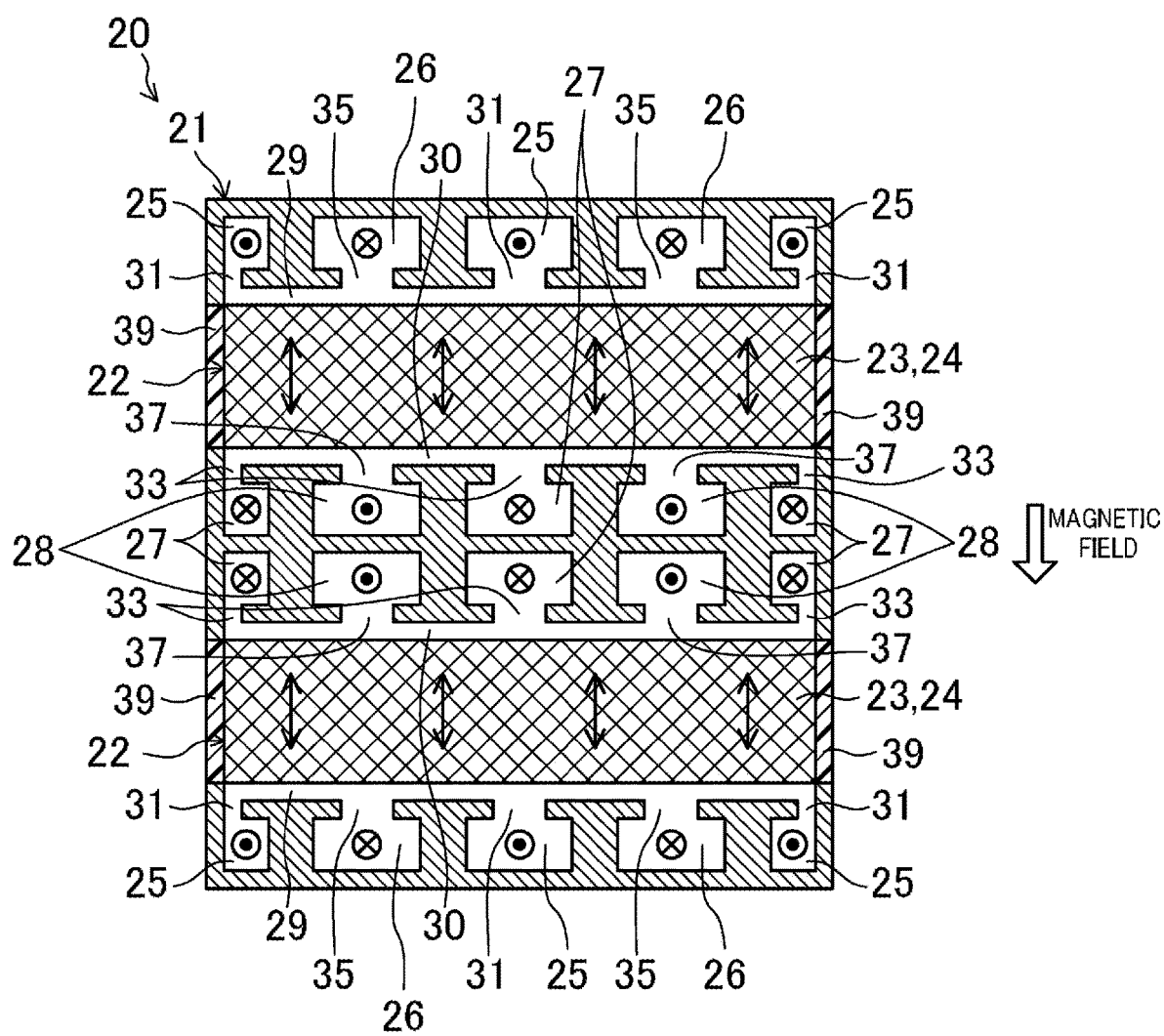
FIG. 16 is a cross-sectional view taken along line XVI-XVI of FIG. 15.

FIG. 15 is four orthogonal views schematically illustrating a configuration of the magnetic refrigeration module (20) of the present embodiment. FIG. 16 is a cross-sectional view taken along line XVI-XVI of FIG. 15.

As shown in the above figures, the magnetic refrigeration module (20) includes two housings (22) extended in the width direction thereof (i.e., the left-right direction in FIG. 15). The two housings (22) are arranged side by side in the height direction of the magnetic refrigeration module (20) (i.e., the vertical direction in FIG. 15). The number and arrangement of the low-temperature inflow and outflow paths (25, 26) and the high-temperature inflow and outflow paths (27, 28) for each of the housings (22) are the same as those of the second variation of the fourth embodiment.

In addition, the magnetic refrigeration module (20) of the present embodiment is provided with two low-temperature headers (45) spaced apart from each other in the height direction.

Advantages of Fifth Embodiment

The magnetic refrigeration module (20) of the present embodiment provides the same advantages as those of the second variation of the fourth embodiment.

While the embodiments and variations thereof have been described above, it will be understood that various changes in form and details may be made without departing from the spirit and scope of the claims. The foregoing embodiments and variations thereof may be combined and replaced with each other without deteriorating the intended functions of the present disclosure.

As can be seen from the foregoing description, the present disclosure is useful for a magnetic refrigeration module.

The invention claimed is:

1. A magnetic refrigeration module comprising:
   a housing that houses a magnetic working substance, the housing forming a flow path configured to carry flow of a heating medium therethrough;
   a low-temperature inflow path configured to carry flow of the heating medium therethrough into a first end of the flow path, a first space being formed between the first end of the flow path and the low-temperature inflow path;
   a high-temperature inflow path configured to carry flow of the heating medium therethrough into a second end of the flow path, a second space being formed between the second end of the flow path and the high-temperature inflow path;
   a low-temperature outflow path configured to receive flow of the heating medium therethrough that is flowing out from the first end of the flow path; and
   a high-temperature outflow path configured to receive flow of the heating medium therethrough that is flowing out from the second end of the flow path;
   a first intermediate flow path that communicates with the low-temperature inflow path and the first space, the first intermediate flow path being configured to expand a flow of the heating medium heading from the low-temperature inflow path to the first space; and
   a second intermediate flow path that communicates with the high-temperature inflow path and the second space, the second intermediate flow path being configured to expand a flow of the heating medium heading from the high-temperature inflow path to the second space,
   the low-temperature inflow path and the first space extending in a longitudinal direction of the magnetic refrigeration module, the first intermediate flow path being between the low-temperature inflow path and the first space,
   the high-temperature inflow path and the second space extending in the longitudinal direction of the magnetic refrigeration module, the second intermediate flow path being between the high-temperature inflow path and the second space.

2. The magnetic refrigeration module of claim 1, wherein each of the first intermediate flow path and the second intermediate flow path includes
an elongated slit,
a plurality of pipe bodies, or
through holes.

3. The magnetic refrigeration module of claim 1, wherein
the housing is configured to have a magnetic field applied thereto, and
the first space and the second space are arranged to sandwich the housing in a direction of the magnetic field applied to the housing.

4. The magnetic refrigeration module of claim 1, wherein
the housing is configured to have a magnetic field applied thereto, and
the first space and the second space are arranged to sandwich the housing in a direction perpendicular to a direction of the magnetic field applied to the housing.

5. The magnetic refrigeration module of claim 1, wherein
a direction of heating medium flow into the low-temperature inflow path and a direction of heating medium flow out of the low-temperature outflow path are opposite to each other, and
a direction of heating medium flow into the high-temperature inflow path and a direction of heating medium flow out of the high-temperature outflow path are opposite to each other.

6. The magnetic refrigeration module of claim 5, wherein
a direction of heating medium flow into the low-temperature inflow path and a direction of heating medium flow out of the high-temperature outflow path are the same, and
a direction of heating medium flow out of the low-temperature outflow path and a direction of heating medium flow into the high-temperature inflow path are the same.

7. The magnetic refrigeration module of claim 5, wherein
a direction of heating medium flow into the low-temperature inflow path and a direction of heating medium flow into the high-temperature inflow path are the same, and
a direction of heating medium flow out of the low-temperature outflow path and a direction of heating medium flow out of the high-temperature outflow path are the same.

8. The magnetic refrigeration module of claim 1, wherein
a direction of heating medium flow into the low-temperature inflow path and a direction of heating medium flow out of the low-temperature outflow path are the same, and
a direction of heating medium flow into the high-temperature inflow path and a direction of heating medium flow out of the high-temperature outflow path are the same.

9. The magnetic refrigeration module of claim 1, further comprising:
a third intermediate flow path communicating with it the first space and the low-temperature outflow path; and
a fourth intermediate flow path communicating with the second space and the high-temperature outflow path,
the first to fourth intermediate flow paths being arranged near a center of the housing in a direction perpendicular to a flow direction of the heating medium in the flow path.

10. The magnetic refrigeration module of claim 1, further comprising:
a third intermediate flow path communicating with the first space and the low-temperature outflow path, and
a fourth intermediate flow path communicating with the second space and the high-temperature outflow path,
the first and second intermediate flow paths being arranged near a first end of the housing in a direction perpendicular to a flow direction of the heating medium in the flow path, and
the third and fourth intermediate flow paths being arranged near a second end of the housing in the direction perpendicular to the flow direction of the heating medium in the flow path.

11. The magnetic refrigeration module of claim 1, further comprising:
a case that houses the housing, the low-temperature and high-temperature inflow paths, the low-temperature and high-temperature outflow paths, and the first and second intermediate flow paths.

12. The magnetic refrigeration module of claim 11, wherein
at least a portion of the case is constructed of a magnetic material.

13. The magnetic refrigeration module of claim 12, wherein
the case includes a short-circuit blocking portion configured to block a short circuit of an applied magnetic field via the case.

14. The magnetic refrigeration module of claim 13, wherein
the short-circuit blocking portion includes a non-magnetic portion arranged between portions of the case constructed of the magnetic material.

15. The magnetic refrigeration module of claim 13, wherein
the short-circuit blocking portion includes a thin portion,
the thinned portion is relatively thinned in the case, and
the thinned portion causes magnetic saturation due to the magnetic field.

16. The magnetic refrigeration module of claim 11, wherein
a portion of the case facing an outer surface of the housing has a lower thermal conductivity than an other portion, an the outer surface of the housing does not face both ends of the flow path.

17. The magnetic refrigeration module of claim 11, wherein
the housing includes a plurality of housings arranged side by side, and
the low-temperature inflow path or the low-temperature outflow path and the high-temperature inflow path or the high-temperature outflow path are arranged side by side in a direction in which the housings are arranged side by side.

18. The magnetic refrigeration module of claim 17, wherein
the case includes a thermal insulator portion provided between
the low-temperature inflow path or the low-temperature outflow path and
the high-temperature inflow path or the high-temperature outflow path.

19. The magnetic refrigeration module of claim 1, wherein the housing includes a plurality of housings arranged side by side in a flow direction of the heating medium in the flow path, and the low-temperature inflow path and the low-temperature outflow path or the high-temperature inflow path and the high-temperature outflow path are arranged between the housings arranged side by side.

20. The magnetic refrigeration module of claim 1, wherein the housing includes a plurality of housings arranged side by side in a direction intersecting with a flow direction of the heating medium in the flow path, the low-temperature inflow path and the low-temperature outflow path are arranged on one side of the housings in the flow direction, and the high-temperature inflow path and the high-temperature outflow path are arranged on an other side of the housings in the flow direction.

21. The magnetic refrigeration module of claim 1, wherein plural sets of the low-temperature inflow path, the high-temperature inflow path, the low-temperature outflow path, and the high-temperature outflow path are provided for a single housing.

* * * * *